Sept. 4, 1951     E. E. WEMP     2,567,042

TRANSMISSION AND CONTROL

Filed Aug. 22, 1946     9 Sheets-Sheet 1

INVENTOR.
*Ernest E. Wemp*

BY

*Barnes, Kisselle, Laughlin & Raisch*
ATTORNEYS

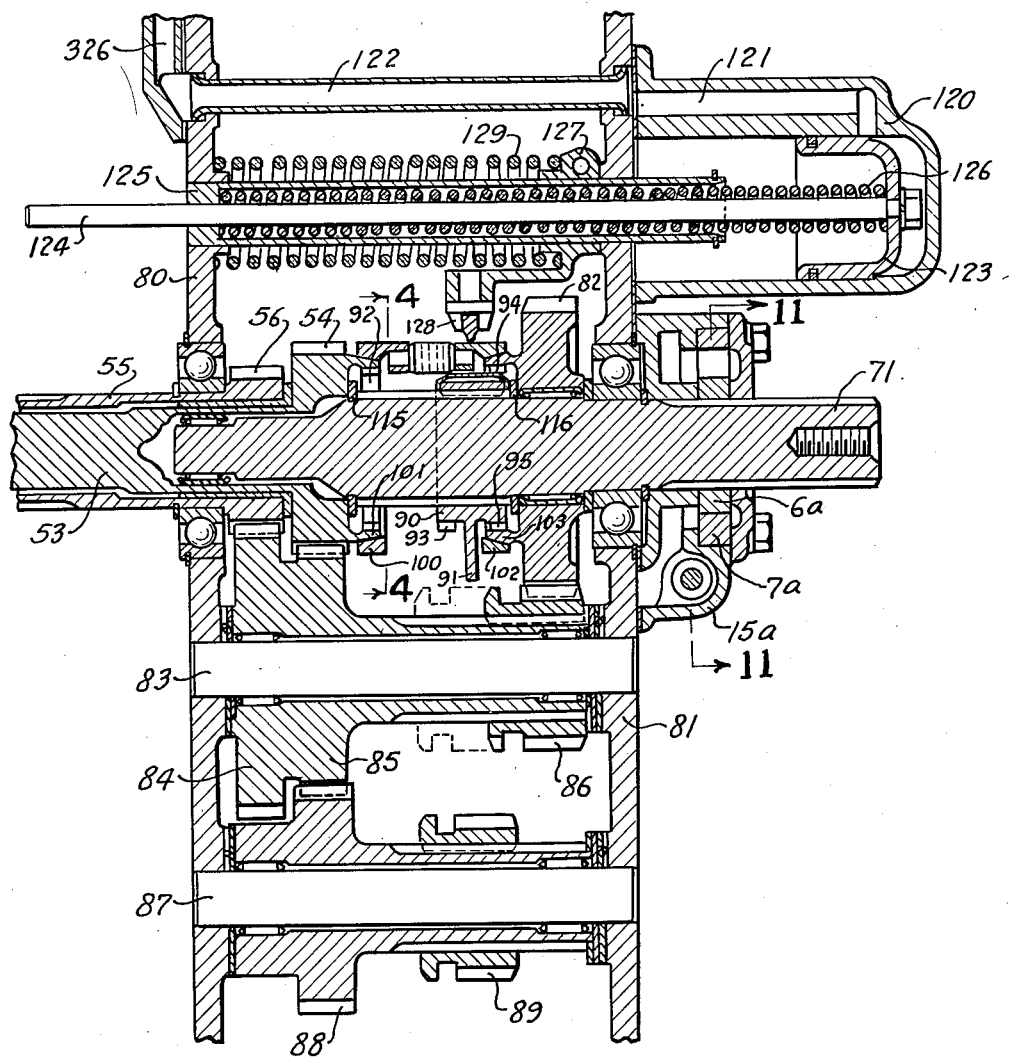

Sept. 4, 1951  E. E. WEMP  2,567,042
TRANSMISSION AND CONTROL
Filed Aug. 22, 1946  9 Sheets-Sheet 3
FIG. 4.
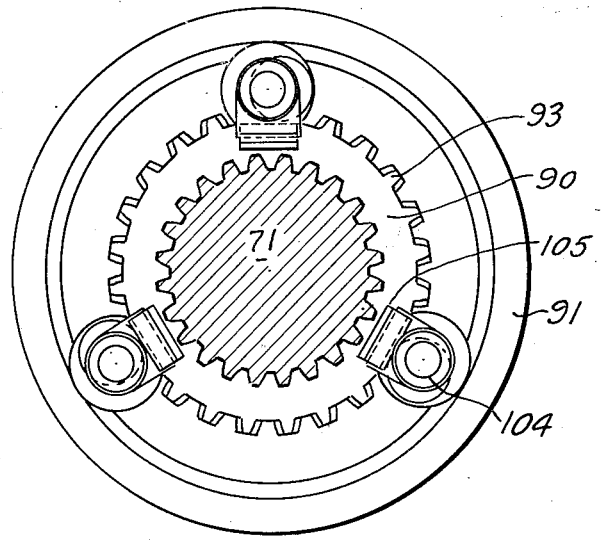
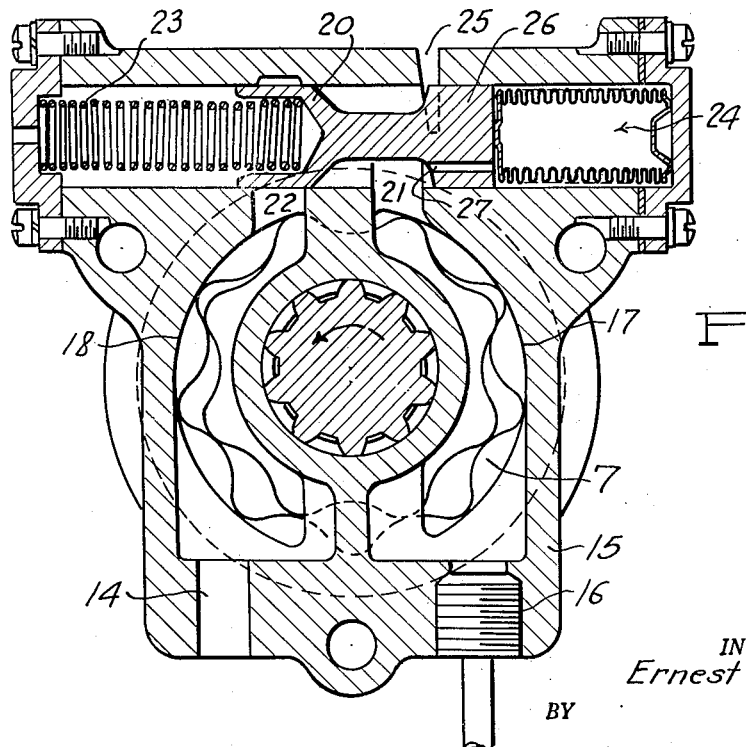
FIG. 3.
INVENTOR.
Ernest E. Wemp
BY
Barnes, Kisselle, Laughlin & Raisch
ATTORNEYS

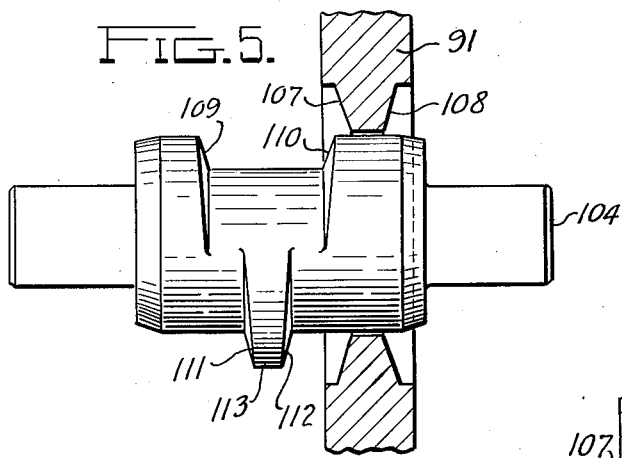
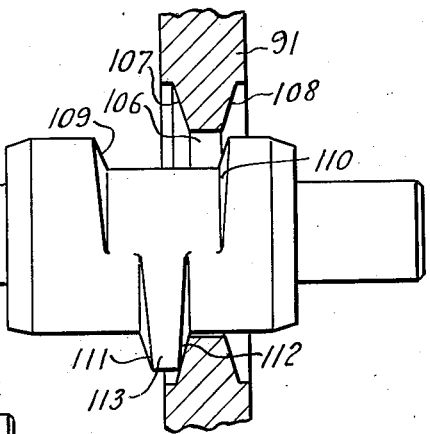
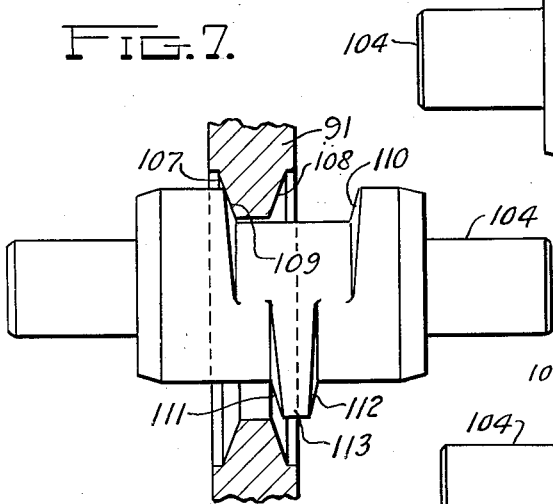
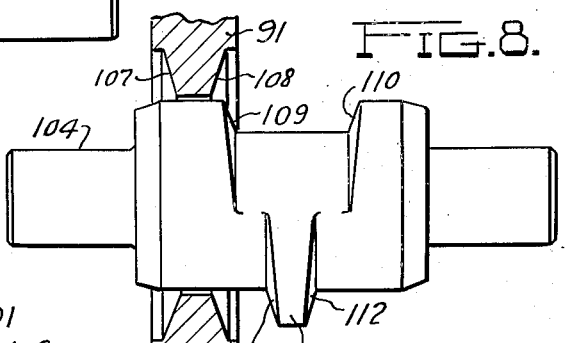
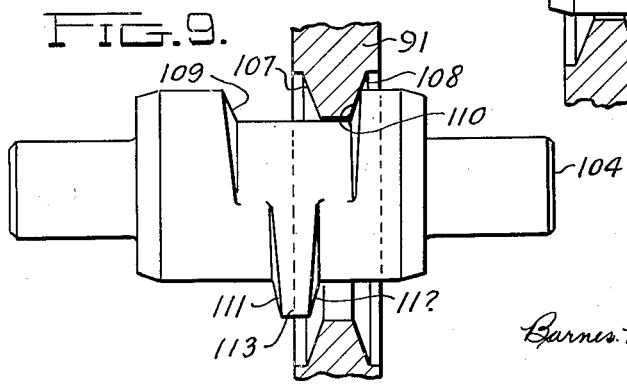
INVENTOR.
Ernest E. Wemp
BY
Barnes, Kisselle, Laughlin & Raisch
ATTORNEYS Sept. 4, 1951 E. E. WEMP 2,567,042
TRANSMISSION AND CONTROL
Filed Aug. 22, 1946 9 Sheets-Sheet 5
FIG. 11
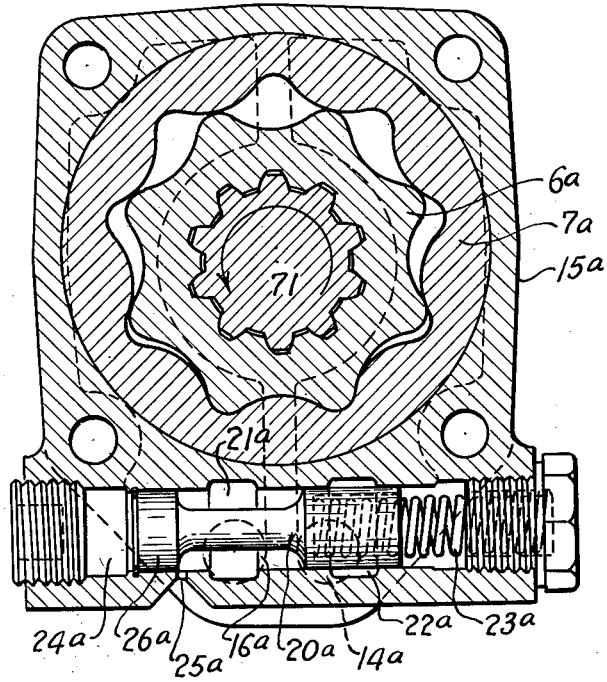
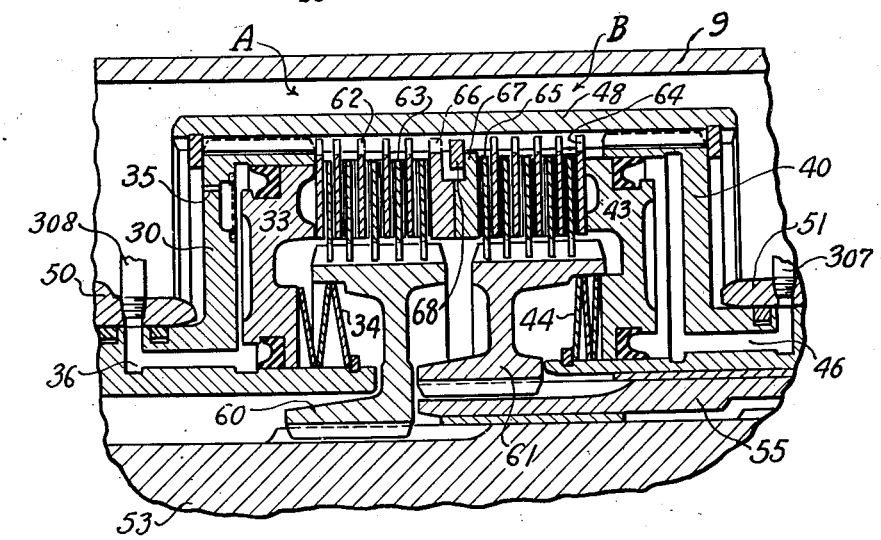
FIG. 10.
INVENTOR.
Ernest E. Wemp
BY
*Barnes Kisselle Laughlin & Raisch*
ATTORNEYS Sept. 4, 1951 E. E. WEMP 2,567,042
TRANSMISSION AND CONTROL
Filed Aug. 22, 1946 9 Sheets-Sheet 6
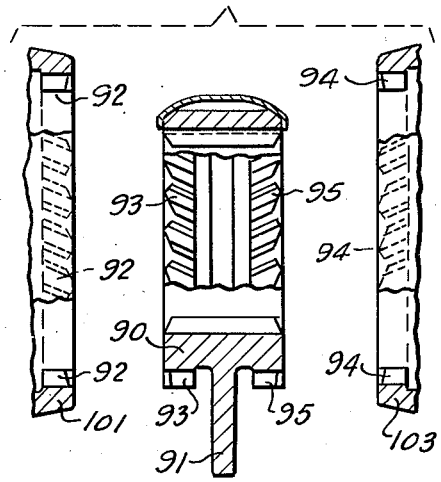
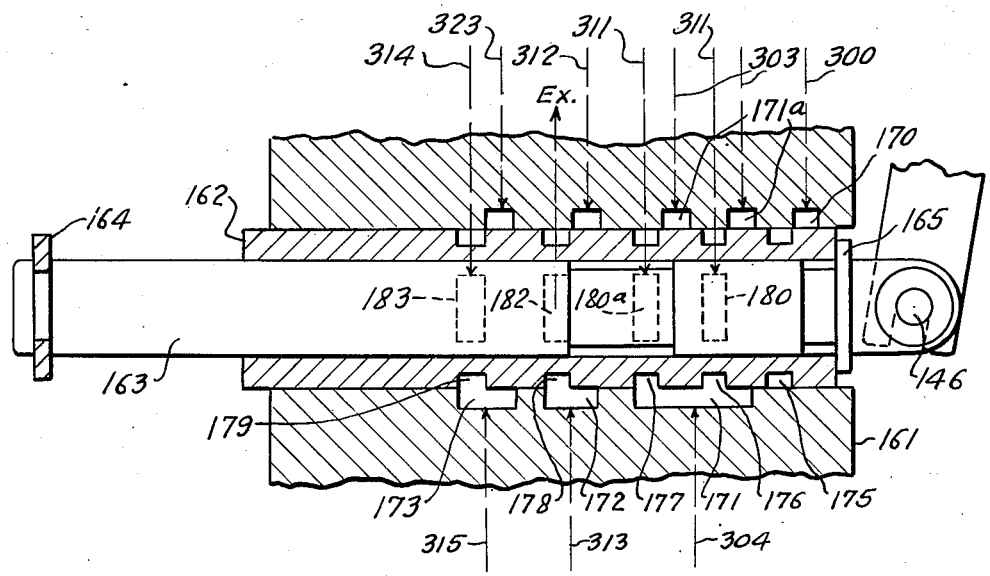
INVENTOR.
Ernest E. Wemp
BY
Barnes, Kisselle, Laughlin & Raisch
ATTORNEYS

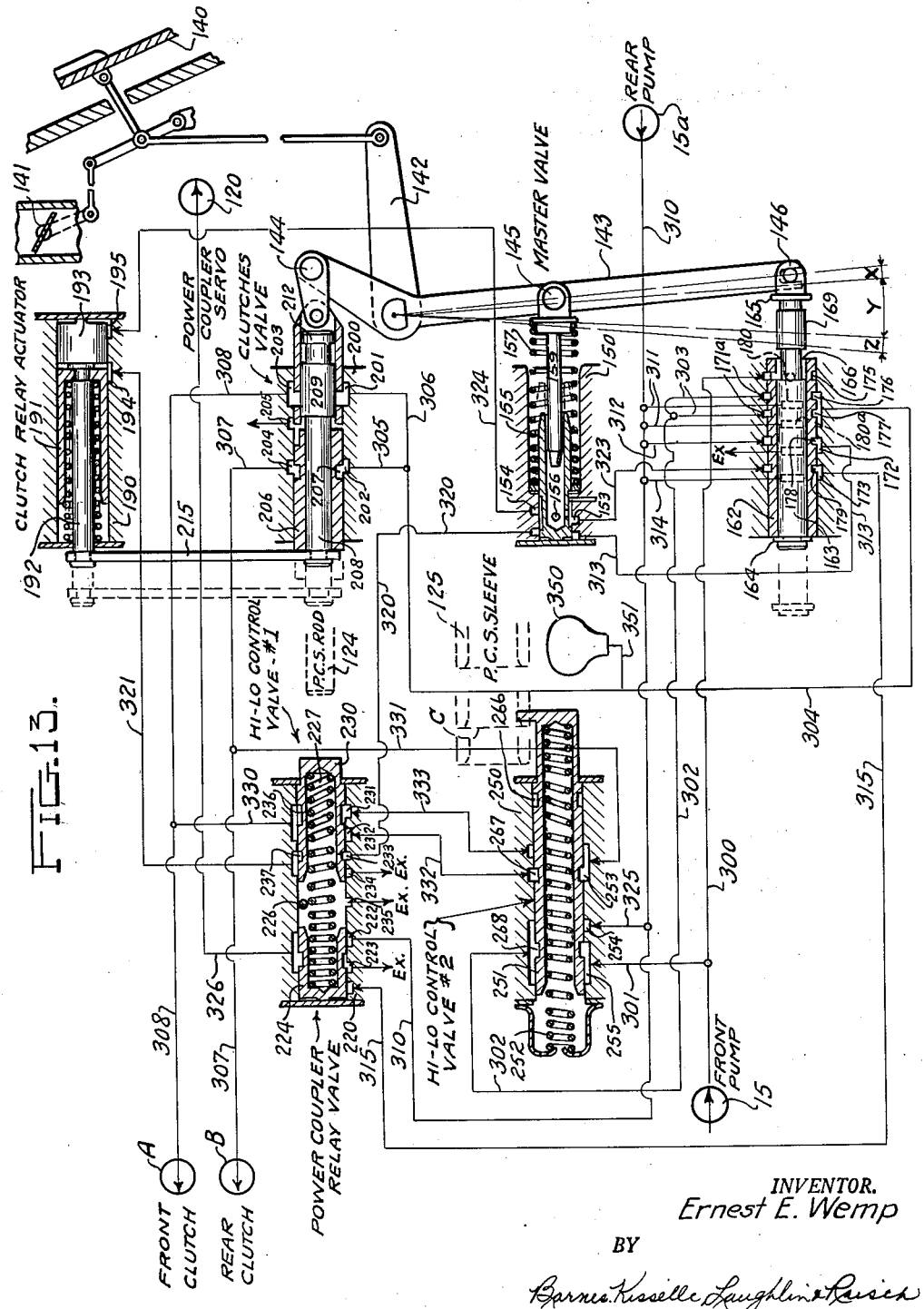

Sept. 4, 1951  E. E. WEMP  2,567,042
TRANSMISSION AND CONTROL
Filed Aug. 22, 1946  9 Sheets-Sheet 8
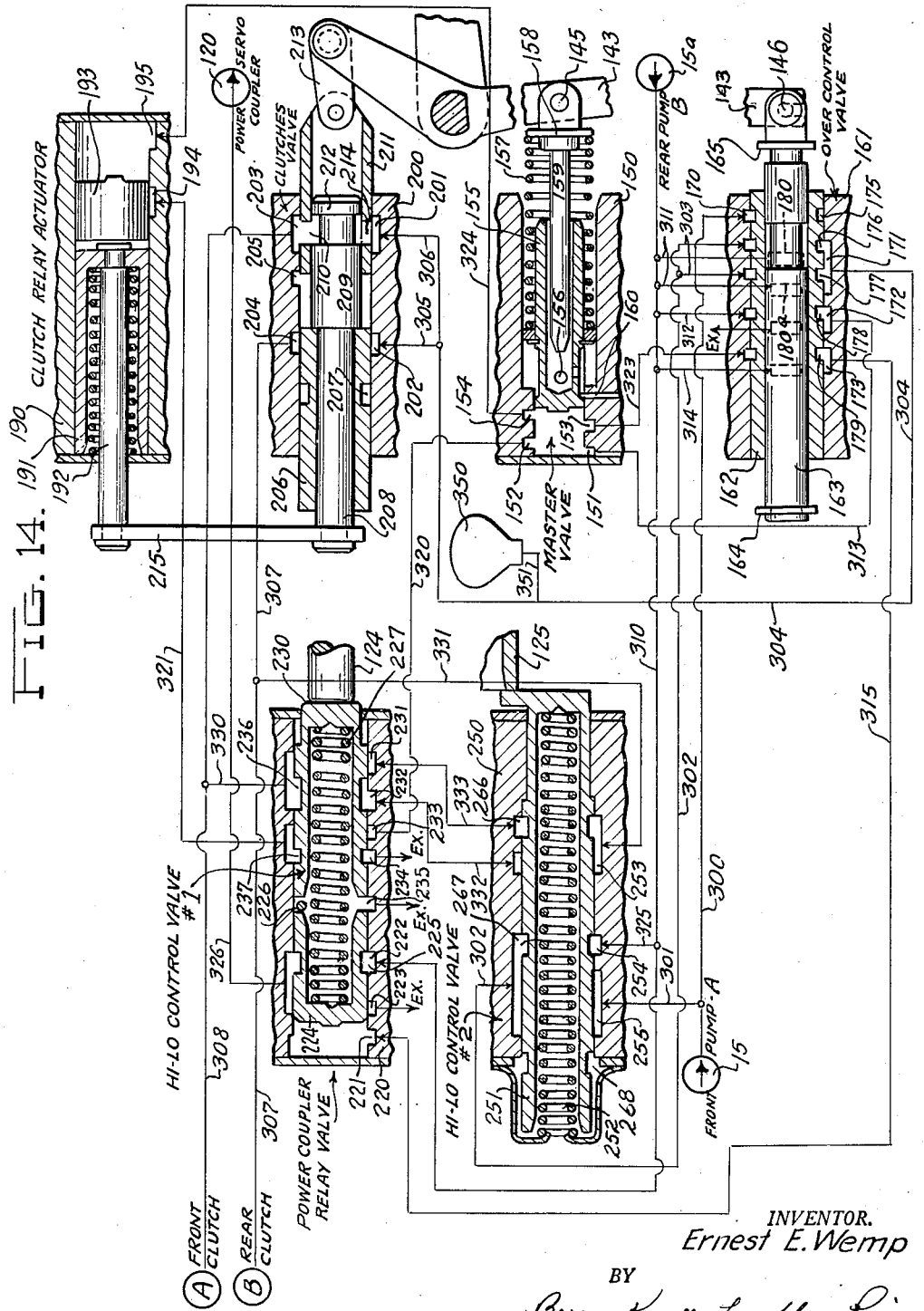
INVENTOR.
Ernest E. Wemp
BY
Barnes, Kisselle, Laughlin & Raisen
ATTORNEYS Sept. 4, 1951           E. E. WEMP           2,567,042

TRANSMISSION AND CONTROL

Filed Aug. 22, 1946           9 Sheets-Sheet 9

GRAPH OF SPRING DATA

INVENTOR.
Ernest E. Wemp
BY
Barnes, Kisselle, Loughlin and Raisch
ATTORNEYS

Patented Sept. 4, 1951

2,567,042

UNITED STATES PATENT OFFICE 2,567,042

TRANSMISSION AND CONTROL

Ernest E. Wemp, Detroit, Mich., assignor of five per cent to Eleanor May Wemp, Los Angeles, Calif., five per cent to Clyde J. Smith, Detroit, Mich., five per cent to Leah Kathleen Smith, Detroit, Mich., and twenty per cent to Lila A. Wemp, Detroit, Mich.

Application August 22, 1946, Serial No. 692,335

25 Claims. (Cl. 74—472)

This invention relates to apparatus for the transmission of torque, such an apparatus being commonly referred to as a transmission, and the invention is directed particularly to transmissions especially for use with automotive vehicles powered by internal combustion engines. While the invention is directed to the provision of a transmission for automotive vehicles, and the disclosure herein makes reference to the transmission of the invention as installed in an automotive vehicle, it, of course, will be appreciated that the transmission may be used in other installations. This application is a continuation in part of application Serial No. 685,824 titled Transmission and Control and filed July 24, 1946, now abandoned.

The overall and general objects of the invention are to provide a transmission of an automatic character for automatically changing the driving ratio between the engine and the driven means, such as the traction wheels of the vehicle. In carrying out the invention a novel combination of elements is embodied in the transmission for providing a power shift. In other words, the transmission is one where a shift from one ratio to another may be effected without relieving the power output of the engine. In this connection, interdependent friction clutching agencies are employed and for some of the shifts in the transmission from one ratio to another, one clutching agency becomes engaged and the other becomes released. Also, a power coupling element is embodied in the structure, the operation of which, in shifting from one ratio to another, is incident to and its action controlled by torque reversal and relative torque reaction.

More specifically, the invention, in a transmission for providing four speed ratios, embodies two friction clutches which are arranged so that one is dependent upon the other during a portion of the ratio change, to thus establish a bucking action which exerts a control upon the engine to vary its speed of operation. The clutches are thus accurately timed as to the engagement of one and the disengagement of the other because they are interdependent. These same clutches are employed for establishing conditions for effecting torque reversal and relative torque reaction in the shift of the power coupler from a position of one ratio to a position of another. Thus, the power coupler and the clutching agencies are interdependent.

The objects of the invention also include the provision of controlling mechanism for controlling system for governing the time when a shift in the ratio is to be made. Among other things, this system is, in turn, governed by and dependent upon both speed and torque. It follows that a shift from one ratio to another is not necessarily progressive but is selective.

To bring out this point a little more clearly, it might be assumed that a vehicle equipped with transmission has just started movement in the low ratio. With a proper speed condition as related to heavy torque, the transmission may shift progressively from low speed into second speed, from second speed to third speed and finally from third speed to fourth speed or high. We are, of course, assuming a four-speed transmission. However, with the vehicle operating in the low speed ratio, and a speed of the vehicle properly related to light torque, the transmission may effect a skip shift; that is to say, the shift may occur automatically from low speed to third speed or even jump completely into the fourth speed. The same conditions prevail in the down shift of the transmission; in other words, when the conditions require a shift from fourth, for example, to a lower speed. In this case, the skip shift may be effected if conditions so require.

A further object is to provide an overcontrol so that under severe conditions the transmission may, by operator control of the accelerator treadle, shift from fourth speed to the third speed ratio in order to effect more rapid acceleration of the vehicle.

In accordance with the invention, a vehicle equipped with the transmission may be controlled entirely through the means of the engine accelerator treadle. The transmission being under the dual influence of speed and torque automatically shifts into higher or lower ratios as those conditions require with the added provision of the over-control which also is effected by manipulation of the accelerator treadle.

So, we have to consider herein the transmission itself which embodies the combination of the friction clutches and the power coupler and the control system therefor which is preferably hydraulic. Other objects of the invention will become apparent as the following detailed description is followed in conjunction with the accompanying drawings:

Fig. 2 is a developed cross sectional view of the coupler unit and transmission gearing.

Fig. 3 is an enlarged cross sectional view showing a pump unit and taken substantially on line 3—3 of Fig. 1.

Fig. 4 is an enlarged view taken substantially on line 4—4 of Fig. 2 showing the coupler and blocker structure, the figure illustrating the structure with one friction ring removed.

Figs. 5 to 9 inclusive are a series of views showing different positions of the blocker elements of the structure, the views being somewhat diagrammatic;

Fig. 5 shows the position of the blocker elements in one position of engagement of the coupler.

Fig. 6 shows an intermediate blocking position when the coupler is being shifted in one direction.

Fig. 7 shows a second blocking position in the shift of the coupler in said one direction.

Fig. 8 shows the position of the parts in the other coupled position of the coupler.

Fig. 9 shows a blocking position in the reverse movement of the coupler.

Fig. 10 is an enlarged sectional view showing the structure for effecting reaction exerted by one clutch upon the other.

Fig. 11 is a cross sectional view of a second pump unit taken substantially on line 11—11 of Fig. 2.

Fig. 12 is a detailed diagrammatic view of the power coupler showing the same in an intermediate uncoupled position and illustrating the right and left hand helical leads on the dentally engaging teeth.

Fig. 13 is a general view showing the hydraulic control mechanism with some of the parts diagrammatically illustrated.

Fig. 14 is a view similar to Fig. 13 with the valves enlarged and showing the same in a different position.

Fig. 15 is an enlarged view of the over-control valve showing the same in over-control position.

Figure 16:
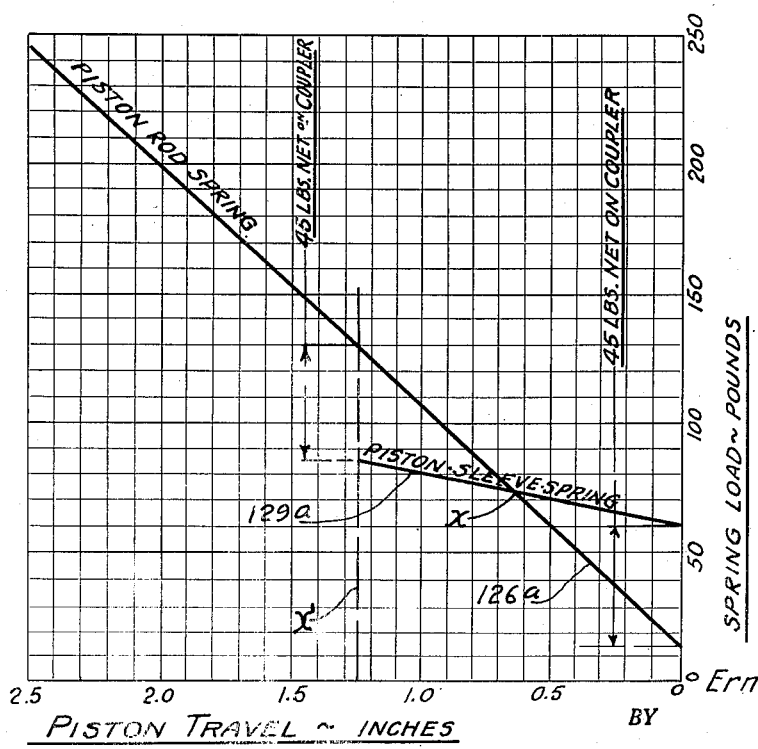

Fig. 16 is a chart showing the rate relationship of springs of the servo piston for the coupler.

Figure 17:
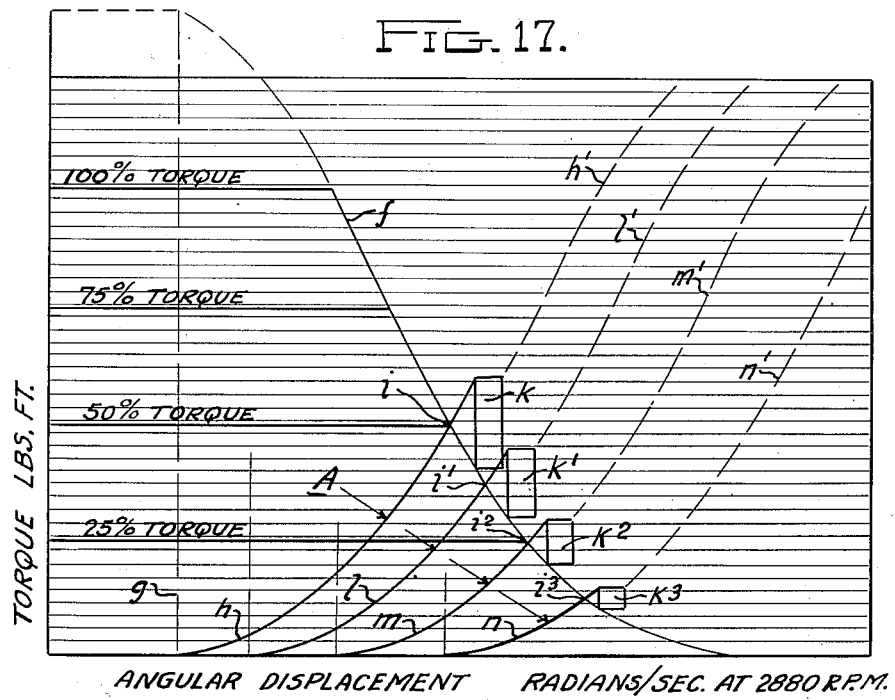

Fig. 17 is a diagram illustrating functions in the release of one clutch and the engagement of the other.

Figure 1:
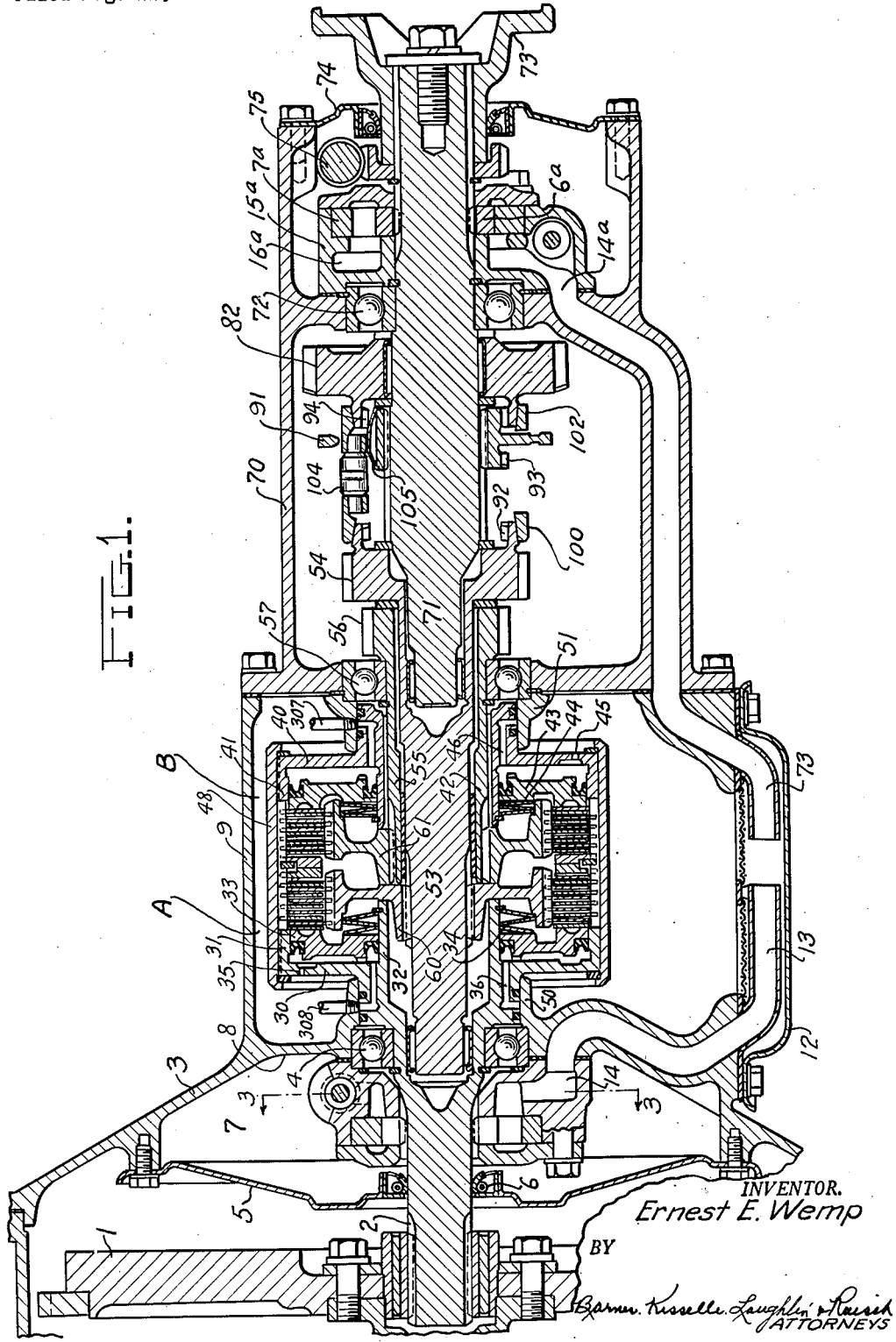
Fig. 1 is a cross sectional view of a transmission constructed in accordance with the invention showing the clutch unit, the coupler unit and the pumps for providing hydraulic pressure.

As illustrated in Fig. 1, the fly wheel of an internal combustion engine 1 is connected in driving relationship with a driving member 2. The member 2 is in the form of a stub shaft journalled in the bell housing 3 by means of an anti-friction bearing 4. There is a plate 5 which has a seal 6 wiping the shaft 2 to provide a chamber 7. This chamber is defined in part by a wall 8 which separates the chamber 7 from a casing 9 which contains a friction clutch arrangement.

Mounted in the chamber 7 is a pump for hydraulic fluid which will hereinafter be referred to as oil. The housing 9 constitutes a sump for the oil, the same being closed by a bottom plate 12 and the pump has an inlet 13 extending from the sump and through the wall 8 to the pump inlet passage 14. This pump structure is disclosed and its temperature and speed sensitive control structure is claimed in my co-pending application Serial No. 648,255 filed February 18, 1946, now Patent No. 2,446,730, dated August 10, 1948. Suffice it to say here, that the pump has a casing 15 through which the shaft 2 extends. A toothed rotor 6 turns with the shaft and rotatably mounted with the shaft is a rotor 7 with an internal configuration corresponding generally to that of the rotor 6 except that it has a different number of recesses for the projections of the rotor 6. The outlet of the pump is shown at 16. The chamber 17 is the high pressure side and the chamber 18 is a low pressure side with a direction of rotation counter-clockwise as indicated. It will be understood that the outlet 16 communicates with the chamber 17. A speed and temperature control may be generally described as comprising a piston 20 acted upon by pressure of the oil passing through port 21. There is a port 22 leading to the low pressure side of the pump. A spring 23 acts on the piston and a temperature sensitive seat therefor is shown at 24. A discharge port is indicated at 25. The seat 24 expands incident to heat and throttles the port 25. Pressure from port 21 is transmitted to the right hand side of the head 26 of the piston through port 27 and high pressure sifts the piston to the left against the action of the spring 23, to connect port 21 to the low pressure port 22. Thus, it will be seen that the pressure of the oil delivered by the pump is controlled both by temperature and by pressure which pressure is incident to speed. With cold oil the port 25 is wide open, thus to relieve what would otherwise be excessively high pressure; as the temperature of the oil increases, the exhaust port 25 is throttled by the expansion of the seat 24. As the pressure increases incident to speed, the piston is shifted to the left as indicated, to relieve the pressure.

The clutch unit

A set of two friction clutches is contained in the housing 9. This arrangement of clutches is fully disclosed and claimed in my co-pending application Serial No. 655,838 filed March 20, 1946, now Patent No. 2,505,450, dated April 25, 1950. The driving member 2 is enlarged to provide an annular cylinder 30 having an outer cylinder wall 31 and inner cylinder wall 32, in which is a piston 33 normally held retracted into the cylinder by a spring structure 34. The cylinder head has one or more vents as at 35 and leading to the cylinder is one or more passages 36.

Oppositely positioned is a cylinder member 40 with an outer wall 41, an inner wall 42 and in this cylinder is a piston 43. This piston is acted upon by spring means 44. The cylinder head is vented as at 45 and one or more passageways 46 lead into the cylinder structure. These two cylinders are tied together for rotation in unison by a member 48 which becomes a driving member for the clutches. A portion of the driving member 2 revolves in an extension 50 of the housing and the cylinder 40 revolves in an extension 51 and suitable sealing rings are embodied as illustrated on opposite sides of the passages 36 and 46 for purposes which will presently appear.

These is a torque transmitting member in the form of a shaft 53, one end of which is piloted in the member 2 and the other end of which has a gear 54 thereon. Journalled on the member 53 is another power transmitting member in the form of a sleeve 55 which has a gear 56 thereon. These two relatively sleeved members are journalled in the housing as by means of an anti-friction bearing 57.

Mounted on the shaft 53 as by means of splines is a clutch member 60 and mounted on the sleeve 55 is a clutch member 61 (Fig. 10). There is a friction clutch unit here shown as multiple disc clutches between the driving member 48 and the members 60 and 61. This structure embodies a series of discs 62 slidably splined to the driving member 48 and alternating discs 63 slidably splined to the hub 60. Similarly there are a plurality of discs 64 slidably splined to the member 48 and a plurality of alternating discs 65 slidably splined to the hub 61. These clutches include cooperating reaction members 66 and 67 which are arranged to abut each other, these members being slidably splined to the driving member 48 and between the reaction members is a fixed reaction member or abutment 68. It will be noted by reference to Fig. 10 how the reaction member 68 is associated with the two reaction members 66 and 67 with looseness for purposes which will presently appear. It will be seen, however, that the clutch which embodies the hub 60, which may be termed the front clutch A, can be engaged by hydraulic pressure which will shift the piston 33 to the right as Fig. 1 is viewed. It will also be seen how the rear clutch B, that is, the clutch embodying the hub 61, may be engaged by hydraulic pressure which shifts the piston 43 to the left as Fig. 1 is viewed. In fact, Fig. 1 shows the rear clutch engaged.

The power coupler unit

To the rear of the housing 9 is a housing 70 for the power coupler and the gears. The final driven member is in the form of a shaft 71 piloted in the shaft 53, journalled in a bearing 72 and having an element 73 for connection to the driven mechanism, such as the propeller shaft extending to traction wheels of the vehicle. In a portion of this housing is a second or rear pump. This pump may be identical to the front pump as shown in Fig. 3 except that it may be turned up-side-down and for convenience, the same reference characters are applied except for the addition of the letter a, (Fig. 11). Suffice it to say that the rotor 6a operates with shaft 71 and oil is pumped from the inlet tube 13 into the inlet 14a and out through the outlet 16a. The chamber is closed by a suitable closure member 74. Incidentally, a power take off is shown at 75 which may be for a speedometer or the like.

Reference may now be made to Fig. 2 which shows the power coupler and a development of the gearing in the housing 70. A front wall is indicated at 80 in which the bearing 57 is contained with the elements 53 and 55 passing therethrough while the rear wall is indicated at 81. Journalled on the shaft 71 is a gear 82. A counter-shaft journalled in the walls of the housing is illustrated at 83 and it carries a gear cluster including a gear 84 and a gear 85. Mounted on the hub of the cluster is a shiftable gear 86 arranged to be shifted into and out of engagement with the gear 82. There is another shaft 87 with a gear 88 cooperating with gear 85 and splined onto the hub of this shaft is a gear 89 arranged to be shifted into and out of engagement with the gear 82. At this point, it may be said that torque may be transmitted from gear 56 through gear 84, gear 86 to gear 82, for providing one ratio; that torque may be transmitted from gear 54 through gear 85, gear 86, to gear 82 at another ratio. If gear 86 is shifted out of engagement with gear 82, and gear 89 is shifted into engagement with gear 82, the gear 82 is rotated in reverse direction. A gearing of this arrangement is disclosed in my co-pending application Serial No. 646,982 filed February 12, 1946, now abandoned. Suitable means is to be employed in shifting the gears 86 and 89 but such means is not disclosed herein.

There is a power coupler unit operative between the gears 54 and 82. A power coupling of this type is covered in Reissue Patent No. 22,761, dated May 28, 1946. The coupler shown herein resides in a shiftable coupler 90 having a driving connection with shaft 71 and preferably this driving connection comprises straight splines. That is to say, the splines run parallel to the axis. This coupler is provided with a flange 91. The gear 54 has an extension with internal teeth 92 and these teeth are angularly disposed helically. The angular disposition depends upon the normal direction of rotation and other factors but, as shown herein, the teeth 92 are helically disposed in a right hand manner (Fig. 12). The coupler has teeth 93 for engagement with the teeth 92 and these likewise are of a righthand helical nature. The gear 82 has a set of internal teeth 94 of opposite helix, namely, of a left hand nature and the coupler has a set of teeth 95 disposed helically on a left hand helix for dental engagement with the teeth 94. In fact, the teeth 94 and 95 are shown in engagement in Fig. 2.

Blocking means is associated with the coupler and this comprises a ring 100 with an internal conical face for frictionally engaging an extension 101 on the gear 54. In fact, the extension 101 carries the internal teeth 92. There is another friction ring 102 with an internal conical face for frictionally engaging the exterior conical surface of an extension 103 of the gear 82. And this extension carries the internal teeth 94.

These two rings are mounted together as a unit by three pins 104 (Figs. 1, 4 and 5) the teeth of the coupler are interrupted at the three locations for the reception of a spring 105. These springs grip the coupler and frictionally engage the pins (Fig. 4). The pins pass through apertures 106 (Fig. 6) in the flange 91 and the metal bounding the apertures is chamfered or bevelled to provide inclined blocking faces 107 and 108. Each pin is formed to provide a recess formation with inclined blocking shoulders 109 and 110 and blocking shoulders 111 and 112 of a rib 113. The structure of the pin advantageously and preferably embodies a true circular cross section on opposite sides of the recess formation and a cross section of a true circle on the center line of the rib 113. As will be seen by reference to Fig. 5 the cross dimension of the pin, from the outside edge of the rib 113 to a diametrically opposite point in the recess is the same as the normal diameter of the pin.

In considering the function of the coupler, reference may be had to Figs. 2 and 5 to 9 inclusive. There is a sequentially acting blocking function which is set up by the blocking shoulders of the pins with reference to the flange of the coupler. This arrangement is shown and described in my application Serial No. 584,695, filed March 24, 1945, now Patent No. 2,441,174, dated May 11, 1948. In the position, as shown in Fig. 2, let it be assumed that torque is being transmitted from the member 54 through gear 85, gear 86 and gear 82; since gear 82 has a dental engagement with the coupler, torque is transmitted through the engaging teeth 94 and 95 to the shaft 71. The gear 54 is therefore operating at a higher rate of speed than the gear 82. Now, assume that the desired function is to shift the coupler out of dental engagement with gear 82 and into engagement with gear 54. An axial load is placed on the flange of the coupler by suitable operating means and at the proper moment which will be described later, the coupler is moved to the left as Fig. 2 is viewed. Through the friction connection established by springs 94, the blocker assembly comprising the two rings 100 and 102 and the connecting blocker pins, is urged to the left and the friction ring 109 frictionally engages the cone face of gear 54. Since gear 54 is rotating faster than the coupler, because gear 54 is connected to the engine and the coupler is connected to the shaft 71, there is a relative torque reaction between the coupler and the blocker. Fig. 5 shows the position of the parts when coupled as shown in Fig. 2. This shifts the blocker and its pins rotationally relative to the coupler, which is in a downward direction, as Fig. 6 is viewed. Therefore, the pins are shifted in their apertures and the blocking face 112 is abutted by the blocking face 107. This is the Fig. 6 position and the coupler is held in this position so long as its relative torque reaction persists. However, the engine and the gear 54 will be decelerated and there will be a reversal of this relative torque reaction which will shift the pins in their apertures in a direction which is upwardly as Fig. 7 is viewed. The coupler will, accordingly, move forward but again be blocked in the Fig. 7 position where the face 107 abuts the blocking face 109. Thus, the coupler has two intermediate blocked positions where it is out of dental engagement with both gear 82 and gear 54. The engine will now accelerate as well also as the gear 54 and when there is another torque reversal the blocker shifts rotationally thus moving the blocking abutment 109 out of engagement with the blocking surface 107 and the coupler then moves to the left as shown by the Fig. 8 position and the teeth 93 move into dental engagement with the teeth 92 of the gear 54.

In reiterating the above function, the gear 54 was rotating faster than the coupler to establish the first blocking position shown in Fig. 6, the gear decelerates through the point of synchronization to establish the second blocking position shown in Fig. 7. Now, as the gear 54 re-accelerates and comes up to the speed of the coupler, the relative motion reaction is lost substantially at the point of synchronization and the dental engagement between teeth 93 and teeth 94 takes place substantially upon such synchronization.

In making the reverse shift of the coupler from the Fig. 8 back to the Fig. 5 position, it will be appreciated that the coupler is to be moved from the faster rotating gear 54 to the slower rotating gear 82. An axial load is placed upon the coupler to shift it to the left as Fig. 2 is viewed and at the proper time it shifts out of engagement with the gear 54. This sets up a relative motion reaction because of the friction engagement between the ring 102 and the portion 103 of the gear 82. Due to the fact that the blocker engages the slower rotating gear a relative motion reaction is set up so that the pins shift in their apertures which is upwardly as Fig. 9 is viewed and the coupler is blocked in an intermediate position when the face 110 is abutted by the surface 108 of the flange. The coupler with its flange will rotate fairly constantly because it is coupled to the shaft 71 which is coupled to the traction wheels while the engine will accelerate, thus accelerating the gear 82 and when the gear reaches the point of synchronism and starts to rotate faster than the coupler the blocker is shifted to cause the blocking shoulder 110 to shift out of blocking position and thereupon the coupler continues its shift to establish a dental engagement with the teeth 94 and 95 substantially at the time of synchronism.

The angular disposition of the dentally engaging teeth makes it feasible to establish dental couplings under torque load. In fact, the dental couplings are not fully established for transmitting torque until the coupler comes to rest in abutting position with suitable stops 115 and 116. Preferably the angle of the helix is such that while a reversal of torque places an axial load on the coupler which in some instances will be in a direction such as to tend to shift the coupler out of dental engagement, the combined loads on the coupler will prevent such shift. The shift of the coupler out of dental engagement preferably occurs substantially at the moment of torque reversal at the dentally engaged teeth. This will be brought out later in connection with the control for automatically governing the transmission. In some instances, in making a shift from Fig. 5 to Fig. 8, there may not be a sufficiently high rate of deceleration to establish the blocking position shown in Fig. 7. In other words, the coupler may skip this position. But if it does, the conditions of synchronism are existent for engagement of the teeth 93 and 92.

The servo control for the coupler is illustrated in Fig. 2 and it comprises a cylinder 120 with a passage for hydraulic fluid as at 121 which connects to a cross tube 122. In this cylinder is a piston 123 to which is attached a piston rod 124. There is a servo sleeve 125 in which the piston rod is slidably disposed and acting between the piston and the servo sleeve is a spring 126. A shifter 127 is mounted on the sleeve, this shifter having a portion which engages the flange 91 of the coupler as shown at 128. A spring 129 is positioned between the shifter and the wall 80 so as to act upon the shifter and react against the wall.

The two springs 126 and 129 have a rate relationship as indicated by the chart in Fig. 16. The piston rod spring 126 has a rate of increasing resistance as indicated by the line 126a while the rate of the spring acting on the coupler and sleeve is indicated by the line 129a. This graph is exemplary only, but a consideration of the same will indicate the function afforded thereby. The springs are preferably preloaded so that in the position of the mechanism as shown in Fig. 2 the spring 129 is applying force on the coupler to the right as Fig. 2 is viewed.

As indicated on the graph, the net force on the coupler to the right is about forty-five pounds. As the piston 123 is moved to the left by hydraulic pressure, the spring 126 is compressed and the resistance offered thereby increases. This resistance equals the load offered by the spring 129 at the point where the two lines cross on chart 16, namely, at the point $x$. Continued movement of the piston to the left, results in an axial force on the coupler in a direction to the left, as Fig. 2 is viewed, tending to shift the coupler out of dental engagement with the gear 82. As shown by the chart in Fig. 16, the piston and its rod 24 has a movement of such length as to substantially compress the spring 126. As shown in the exemplary chart (Fig. 16) the piston may, for example, move about 2.5 inches thus loading the spring 126 until it exerts a pressure in the vicinity of 250 pounds. When the piston has moved to the limit of its movement to the left the spring combination is cocked, so to speak, and ready to shift the coupler when other proper conditions exist. These conditions include the substantial cessation of the torque or the reversal of the torque at the engaged teeth 95 and 94. Upon such torque reversal, for example, the coupler is shifted to the left by the spring 126 and out of dental engagement with the gear 82. When this occurs, the sleeve 125 shifts with the coupler and inasmuch as sleeve 125 is taking the reaction of the spring 126 the compression of the spring is released. The piston 123, for example, may have a total movement of 2.5 inches while the sleeve and coupler have a movement of about 1.25 inches. Accordingly, as the sleeve 125 moves to the left with compression of spring 129 as shown by line 129a (Fig. 16), the compression on the spring 126 is relieved and the varying pressure moves back down the line 126a. The limit of movement of the coupler in its engaged position with gear 54 is indicated by the line x' (Fig. 16) at which time it will be noted that the net difference of loads on the springs is about 45 pounds, this load being applied to the sleeve in a direction to the left as Fig. 2 is viewed and as the chart 16 is viewed.

Accordingly, while the compression of the spring 126 is relieved upon movement of the sleeve, there is sufficient excess compression thereof caused by a stroke of movement of the piston greater than the stroke of movement of the sleeve, so that the spring 126a holds the coupler to the left and in engagement with the gear 54. A control of this nature is shown in my application Serial No. 646,982, filed February 12, 1946, now replaced by application Serial No. 20,002, filed April 9, 1948, although the control herein differs from the one in said application in that the net spring forces are applied to the coupler in one direction to tend to maintain one position of dental engagement and are applied to the coupler in the opposite direction to tend to maintain the other position of dental engagement.

The control

In the transmission shown the arrangement provides for four speeds in a forward direction. In low speed or low gear the torque is transmitted through the closed clutch B, the sleeve 55 and gear 56; from gear 56 torque is transmitted through gear 84, gear 86, gear 82 through the dentally engaged teeth 94 and 95 through the coupler and the shaft 71. This is the position shown on Figs. 1 and 2. In the second speed the clutch B is disengaged and the clutch A engaged and the torque is transmitted from shaft 53 to gear 54; the torque continues through gear 85, gear 86, gear 82, the coupler 90, to shaft 71. So it will be seen that in shifting from low to second, or vice versa, there is only a change in the two clutches. The coupler provides the range, and it is in the low range when coupled to gear 82; for third speed, the coupler 90 is shifted into engagement with the gear 54 through the dentally engaging teeth 92 and 93. The torque is then transmitted, for third speed, through the clutch B, sleeve 55, gear 56, thence through gear 84, gear 85, to gear 54, which is coupled to the shaft 71. In fourth speed or direct, the clutch A is engaged and the torque is transmitted to shaft 53, to gear 54 and since gear 54 is coupled to the coupler the torque is transmitted direct through the teeth 92 and 93 to the coupler 90 and shaft 71.

The control, which is preferably hydraulic as shown in Figs. 13, 14 and 15, is associated with the engine throttle actuator indicated at 140 for operating the engine throttle valve 141 and the actuator, in the form of a treadle 140 is connected through the linkage shown to a lever arm 142 for actuating a lever 143 which is connected at 144, 145 and 146 to three of the controlling valves. The several valves can probably be best appreciated by reference to Fig. 14 where they are somewhat enlarged. There is a master valve 150 which is under the control of speed and torque. This valve has an inlet 151 for the hydraulic oil and an outlet for three of the speed ratios as shown respectively at 152, 153 and 154. In this valve is a piston valve member 155 with one or more exhaust ports 156. A spring 157 is positioned between the valve member and a spring seat 158 which is connected to the lever 143, the spring seat having a stem 159 loosely piloted within the valve member. The piston valve member operates between extreme positions, one of which is shown in Fig. 13, where it abuts the end of the head of the chamber of the valve 150 and one of which is shown in Fig. 14, where its abuts a stop 160.

There is what may be termed an over-control valve 161 which has a sleeve 162 therein as best shown in Fig. 15. Slidably positioned in the sleeve is a valving member 163 which is connected to the lever 143 at 146. This valving member has a head 164 and a head 165 for shifting the sleeve and it has an exhaust port 166 Fig. 13.

The over-control valve body has a series of ports 170, 171, 172, and 173. The sleeve has cooperating ports 175, 176, 177, 178, and 179. The port 171 shown in the lower part of the valve 161 is rather elongated and connects to two portions shown at 171a (Fig. 15).

The valve body also has four ports therein 180, 180a, 182 and 183. These ports are shown in dotted lines and are positioned back of the plunger valve member 163. The ports in the body of the valve 161 are in the form of internal circumferential grooves; the ports in the sleeve are in the form of external circumferential grooves and the grooves in the sleeve are arranged to be brought into and out of registry in the body. Also, the grooves in the sleeve are arranged to be brought into and out of registry with the ports 180, 180a, 182 and 183 in the body.

There is a clutch relay actuator which has a cylinder body 190 with a double piston therein comprising a piston 191 acted on by a spring 192. A secondary piston head 193 is arranged to contact the head of the piston 191 and the piston 191 has a piston rod 192. The body 190 is provided with a port 194 and a port 195. The valve for selecting the clutches has a body 200 with ports 201 and 202 and ports 203 and 204 and an exhaust port 205. In this valve body is a shiftable valve sleeve 206 with a port 207 and a valve rod 208 with a valving head portion 209 and a reduced portion providing a port 210. A valving member 211 is associated with the clutch valve 200, this being in the form of a sleeve for receiving the head 212 of the valving rod 208 and this sleeve is connected to the lever 143 by a link 213. The valving sleeve 211 has ports 214 for cooperating with the port 210 in the valve piston 208. It will be noted that piston rod 192 of the clutch relay actuator is connected to the valving piston 208 of the clutch valve 200, this being accomplished by a connecting element 215. Accordingly, movement of the piston rod 192 shifts the valving piston 208.

There is a power coupler relay valve having a body 220 with a port 221 and another port 222 and an exhaust port 223. In this body is a piston valve 224 with a groove port 225. For the valve member 224 is a stop 226. A control valve which may be called a high-low control valve at 230 is disposed in the valve body 220 and between the valve member 224 and the valve member 230 is a spring 227. The valve body 220 has ports 231, 232 and 233 and exhaust ports 234 and 235. Valve member 230 has ports 236 and 237.

A second high-low control valve has a body 250 with a valve member 251 therein acted upon by a spring 252. This valve body has a port 253, a port 254 and a port 255. The valve member has cooperating ports 266, 267 and 268.

The various conduits or pipe lines for the hydraulic medium are shown in Figs. 13 and 14 as lines. The outlet of the front pump 15 connects to line 300; this line extends to the port 170 of the over-control valve. It also connects to line 301 which connects into port 255 of the control valve 250, through this valve to line 302. Line 302 connects into double conduits 303 which connect into ports 171a of the over-control valve through this valve into line 304 which then extends to the clutch valve 200 through lines 305 and 306. A pressure bell 350 is preferably employed and connected into the line 304 by a conduit or line 351. This pressure bell provides an adequate volume of liquid at certain times in the operation and also cushions hydraulic shock. It will be understood that oil is pumped into the bell against pressure of air trapped in the upper portion thereof. The high pressure line which connects into the outlet of the rear pump 15a is shown at 310. Leading therefrom are dual lines 311 which connect into the ports 180 and 180a of the over-control valve. The double lines 303 and 311 are small lines and are used double to provide adequate capacity. Also, extending from the line 310 is a line 312 which extends to the port 172 of the over-control valve and through this valve into line 313 which extends to the master valve connecting into the inlet 151. Also extending from the high pressure line 310 of the rear pump is a line 314 which connects into the port 183. The port 182 of the over-control valve is an exhaust port. Wherever an exhaust port appears it is marked ex.

Leading from the port 173 of the over-control valve is a high pressure line 315 which connects into the port 221 of the power coupler relay valve. A high pressure line 320 extends from the port 152 of the master valve to port 233 of the power coupler relay valve and through this valve into line 321 which opens into port 194 of the clutch relay actuator. Also, extending from the master valve is a line 323 which extends from the port 153 of the master valve to port 173 of the over-control valve. Extending from the master valve is a line 234 which communicates with the port 195 of the clutch relay actuator.

The high pressure line 310 from the rear pump connects into port 254 of the high-low control valve 250 through line 325 and it extends also to port 222 of the power coupler relay valve and through this valve into line 326 to the power coupler servo cylinder 120 diagrammatically shown on Figs. 13 and 14.

The ports 223, 234 and 235 of the valve 220 are exhaust ports. There is a line 330 which connects the hydraulic line 300 with port 232 of the power coupler relay valve 220, and a line 331 which connects the line 307 with port 253 of the high-low control valve 250. These two lines 330 and 331 are arranged to be connected at appropriate times by hydraulic lines 332 and 333. Line 332 extends from port 232 of the valve 220 to a port 253 of the valve 250, while line 333 extends from port 231 of the high-low control valve 220 to port 253 of the high-low control valve 250.

In the manipulation of the accelerator treadle 140 the lever 143 is rocked about its axis through the angles illustrated in Fig. 13. The accelerator treadle has a lash or ineffective movement through the angle x. As the accelerator treadle is moved further to substantially full open throttle position the lever 143 moves through the angle y. Then the accelerator treadle has an additional over-control movement in which it shifts the lever 143 through the angle z. It will be observed that the master valve 150 is under the control of the accelerator as it is associated with the lever 143 through the spring 157. As the accelerator is depressed the spring 157 is tensioned in a direction which tends to push the valve 155 to the left as Figs. 13 and 14 are viewed. Also, it will be noted that the shiftable valve member 211 is under the control of the accelerator and its action depends upon the position thereof.

Operation

In considering the operation let it be assumed that the transmission and the control are mounted in an automotive vehicle and that the vehicle is at rest while the engine is operating at an idle speed. The front pump 15 is therefore operating and it is pumping oil into the line 300 (Fig. 13), but this oil is exhausted through the open port 166. Therefore, there is no clutching action. Upon the depressing of the accelerator 140 to open the throttle of the engine, the first movement of the lever 142 is through the angle x and which brings the head 169 of the valve 163 into a position to close the port 166. This closes the exhaust and the pressure from the front pump 15 now passes through lines 301, 302, the double lines 303, through the over-control valve into line 304. The oil under pressure continues through line 305, through clutch valve 200, into line 307. This line 307 extends to the rear clutch B (Fig. 1) and it begins to shift the piston 43 and engages the clutch B. The part 209 of the valve rod 208 blocks the passage through the valving member 211 and thus closes the line 306.

In considering the matter, it will be appreciated that the position of the parts and the valves as shown in Fig. 13 is the initial starting or at rest position. As the friction clutch B engages, torque is transmitted through the mechanism above described which is the low ratio connection, as shown in Fig. 2, and the shaft 71 begins to turn resulting in movement of the vehicle. With the vehicle thus moving in low speed, the rear pump 15a begins to operate as it is operated by the shaft 71. This pumps the oil into the high pressure line 310. Lines 311 are closed as they lead to the now closed ports 180 and 180a. However, the oil from the rear pump passes through line 312 through the over-control valve which is positioned, as shown in Fig. 15, into line 313 leading to the master valve. Oil from the rear pump also passes through line 314 to the port 183 which is closed; the oil flows through line 325 which is closed at the high-low control valve and line 310 continues to the power coupler relay valve where it is closed by the power coupler relay valve. With continued movement of the vehicle and as it accelerates, the pressure from the rear pump increases and it pushes the valve member 155 of the master valve to the right. It will be observed now that the master valve 155 is under the combined influence of speed of the vehicle calculated in terms of pressure and torque of the engine calculated by the position of the throttle.

When the pressure has reached the point where it shifts the master valve 155 to the right it opens first, port 152. Oil under pressure is now transmitted through line 320 through the high-low control valve into line 321 and into the midport 194 of the clutch relay actuator 190. This shifts the piston 191 which, through its connector 215 shifts the valve member 208; this shifts the port 210 into a position for opening the connection from line 306 to line 308. Thus, line 308 transmits oil under pressure to the front clutch A and front clutch A begins to engage. As the valve member 208 so shifts from the full line position shown in Fig. 13 to the position shown in Fig. 14, there is a period when oil under pressure is transmitted to both clutches, then the head 209 picks up the sleeve 206 and disaligns ports 207, thus cutting off the supply of oil to the rear clutch. In other words, this cuts off the oil line 305.

With the front clutch engaging under the oil pressure it finds reaction in the rear clutch B so that both clutches are at least partially engaged. The oil from rear clutch B is bleeding from the bleed port 45. There is, accordingly, a bucking torque on the engine as one clutch is driving the gear 56 and the other clutch is driving the gear 54 and they are coupled together to rotate at different speeds. Therefore, the speed of the engine is reduced. As the plates of the rear clutch B back away in the bleeding action the plates of the front clutch take reaction against the fixed reaction member 68 and thereafter the front clutch A continues engagement and the rear clutch B continues disengagement until finally the torque is transmitted entirely by the front clutch A which provides the second ratio through gear 54 and the connections shown in Fig. 2.

As the speed of the vehicle increases further, resulting in increase in speed of rotation of the rear pump 15a, and resultant increase in pressure, the master valve is shifted further to the right and it opens the third speed port 153. Now, in shifting from the second speed to the third speed, there is a shift of the power coupler as well as a shift in the clutches. Upon the opening of port 153 the pressure is transmitted through line 323 to the over-control valve and through the ports shown into line 315. This line extends to the power coupler relay valve and enters the port 221 and shifts the valve member 224 to the position shown in Fig. 14 against the stop 226.

In this shift of the valve 224, the line 310 from the rear pump is opened through the line ports 222 and 225 to the line 326 which extends to the cylinder of the power coupler servo, as shown in Fig. 2. This will move the piston 123 and compress the spring 126 and ultimately will load the spring 129 thus cocking the same for a shift of the coupler as will presently be seen. In the last increment of movement of the piston and specifically its piston rod 124, the same contacts the control valve 230 and shifts it against the action of the spring 227 to the position shown in Fig. 14. This opens the line 321 to the exhaust port 234, thus permitting the spring 192 to shift the clutch relay actuator back to its full line position as shown in Fig. 13. This opens the high pressure line 305 to the line 307 to apply oil under pressure to the rear clutch and start its engagement.

At this time, the valve port 210 has closed the connection between pressure lines 306 and 308 for supplying oil to the front clutch. However, at this particular point, both clutches are supplied with oil by parallel lines as follows: Through line 331, through the control valve 250, through the aligned ports as shown in Fig. 13, line 332 and to line 330 through the aligned ports of the high-low control valve No. 1 which is now positioned as shown in Fig. 14, the line 330 connecting into the front clutch line 308. The function of the pressure bell 350 in supplying an adequate volume is particularly useful when both clutches are opened to the pressure line through the parallel lines as just described. In other words, the volume of oil is desired for quickly entering the clutch chambers, both of which are opened and the expansion of air trapped in the bell forces some of the oil into the pressure line for this purpose.

Therefore, the rear clutch is engaging and pressure is partially maintained on the front clutch A, and the rear clutch B finds reaction in the front clutch as its plates are backed up against the plates of the front clutch. This clutching action, in a manner like that previously described, sets up a bucking torque on the engine tending to decelerate the same. At the start of this action, the front clutch was transmitting the torque and, therefore, there was a torque load on the coupler teeth 94 and 95. Since these are teeth on a left hand helix, this torque load tends to hold the coupler in dental engagement. Therefore, even though the coupler servo spring 129 is compressed and cocked, ready for action, the coupler remains dentally engaged with the gear 82. The rear clutch continues its engaging action with the result that the engine decelerates by the opposing or bucking action of the clutches and finally, and substantially upon a reversal of torque on the dentally engaging teeth 94 and 95, the coupler pops out of dental engagement.

Now, it will be remembered that at this moment, the friction ring 100 engages the conical face 101 of the gear 54 and gear 54 is rotating faster than the gear 82, and, therefore, faster than the coupler and shaft 71. This shifts the blocker to the first blocking position as shown in Fig. 6. The bucking clutch action continues until the engine decelerates through the point of synchronism and to a speed lower than that of the coupler. The relative motion reaction reverses and the blocker shifts to the blocking position shown at Fig. 7 with resultant increment of axial movement of the coupler. The engine and, more specifically, the gear 54 is now rotating slower than the shaft 71 and the coupler. In this last named increment of movement the coupler sleeve 125 strikes the control valve member 251 and shifts it from the position shown in Fig. 13 to a position corresponding to the dotted line position c of Fig. 13. This closes the port leading to line 332 and thus stops the flow of oil to the front clutch through line 330 and 308. Therefore, the front clutch begins to bleed with continued engagement of the rear clutch and the bucking torque is reduced resulting in an increase of the speed of the engine. When the speed of the engine increases to the point where the gear 54 starts to overrun the coupler 105, the blocker shifts due to the reversal of relative motion reaction as shown in Fig. 7, to let the coupler shift from the Fig. 7 position to the Fig. 8 position, thus establishing a dental engagement between the coupler and the gear 54. Ultimately, the rear clutch becomes fully engaged and the front clutch fully disengaged and the third speed ratio is effected through rear clutch B, sleeve 55, gear 56, gear 84, gear 85, and gear 54 through the coupler to the shaft 71.

The coupler is now in its high range position. The final movement of the coupler servo sleeve shifts the valve member 251 to the position shown in Fig. 14. This opens the parallel line 331 through the valve 250 to the line 333, but this line is closed by the valve 230 as shown in Fig. 14. At the same time, approximately, the line 301 from the front pump is cut off by displacement of the port 268 as shown by Fig. 14 and the line 325 from the rear pump is connected by port 267 to the line 302 so that the rear pump functions to supply oil pressure to the clutches in third and fourth speeds.

It remains now to establish the fourth speed ratio which is done by changing the drive from the rear clutch to the front clutch and this is done substantially in the same manner as the shift was made from low speed to second speed. As the pressure increases on the master valve due to increase of speed, the master valve shifts to open the port 154 so that the oil under pressure is transmitted through line 324 to the port 195 of the clutch relay actuator. This shifts the actuator, including the free piston 193 to the position shown in Fig. 14, thus shifting the clutch valve member 208, closing the connection between the pressure line 305 and 307 to the rear clutch and opening the connection between line 306 and 308 to the front clutch. The front clutch finds reaction in the bleeding rear clutch but ultimately the rear clutch becomes disengaged and the front clutch fully engaged, and the high or direct ratio is established. The torque is now transmitted through the front clutch A, shaft 53, gear 5ʳ, the dentally engaging teeth 92 and 93, to the coupler and to the shaft 71.

Now, it will be observed that the master valve is under the combined control of speed and torque and with this arrangement, the up-shift, that is, the shift from a lower speed to a higher speed, just described, is not merely progressive but selective, depending upon conditions. To demonstrate this function let it be assumed, for example, that the vehicle is started by opening the throttle relatively widely. The heavy throttle position holds the master valve from shifting while the pressure of the hydraulic medium builds up with increase of speed. The heavier the throttle, the more pressure required and, therefore, the more speed required to shift the master valve member. Now, let it be assumed that the operator relieves the throttle; this results in continued high pressure of the hydraulic medium and a light compression of spring 157. The master valve may shift far enough to uncover the third speed port 153 or the fourth speed port 154, and the shift will be automatic into third or fourth depending upon the position of the master valve. At this point, it might be brought out that in the down-shift, it may be assumed that the master valve will retract to the left as Fig. 14 is viewed, covering the fourth speed port 154 and opening third speed port 153 and the shift will be reversed from fourth to third. This merely consists in disengagement of the front clutch accompanied by engagement of the rear clutch. Or, if conditions are such that the master valve piston shifts far enough to the left to cover the high speed port 154 and the third speed port 153, a skip shift will be effected and the mechanism will drop from fourth to second or even to first if conditions require.

In shifting down, from the high range of the coupler to the low range of the coupler, the situation is just the reverse. We shall assume a shift from third to second speed ratio. The coupler is coupled with the gear 54 and the rear clutch is engaged. The master valve will call for and effect a discontinuance of oil under pressure to the power coupler servo cylinder 120 and the piston will start moving to the right as Fig. 2 is viewed under the action of the spring 126. The first increment of movement lets the valve 230 move back to the position shown in Fig. 13 so that the parallel pressure lines to the clutches are connected through lines 331 and 333 and 330 so that both clutches are open to pressure.

The bucking action decelerates the engine with the front clutch taking an increasing amount of torque and substantially at the time there is a torque reversal at the dentally engaging teeth 92 and 93, the coupler pops out of dental engagement with the gear 54. Now, this dental disengagement will not take place until substantially at torque reversal at teeth 92 and 93 because of the loads thereon. These teeth are on a right hand helix and since the teeth 92 are driving the teeth 93 the thrust tends to hold the coupler to the left to maintain engagement. The reversal of torque aids movement of the coupler out of dental engagement because of the right hand helix of the teeth. There is, of course, a movement of the coupler sleeve 125 and immediately upon such movement, the valve member 251 is restored to the position shown in Fig. 13 thus closing the parallel line 333 and cutting off the hydraulic pressure to the rear clutch. The rear clutch may now continue to bleed providing some reaction to the front clutch which continues engagement. However, the coupler is now moving from the faster running gear 54 toward the slower running gear 82 and, therefore, a sequential blocking is not necessary. When the rear clutch is bled to the point where the front clutch finds its reaction against the fixed stop 68, the bucking action is relieved. At this time, the blocker position is that shown in Fig. 9. Upon relief of the bucking action of the clutches the engine accelerates thus accelerating the gear 82. When the speed of the gear 82 tends to over-run the coupler the relative motion reaction between the gear and the blocker sleeve is lost or reversed and the spring 129 shifts the coupler into dental engagement with the gear 82 substantially at the moment of synchronism. Ultimately, front clutch A becomes fully engaged and rear clutch B becomes fully disengaged and second gear ratio is established.

Thus, it will be seen that the power coupler shifts to and from its high and low range positions depending upon a position of the master valve and that the front clutch A or the rear clutch B is selected for engagement also dependent upon the position of the master valve which is under the dual control of torque and speed.

The over-control valve causes a shift from the direct drive ratio to the next lower ratio which is from fourth to third. This embodies disengaging the front clutch A and engaging the rear clutch B. Assuming that the ratio is established in fourth speed with the parts positioned as shown in Fig. 14; the over-control is made effective by depressing the clutch pedal to shift the lever 143 through the angle z. The shoulder 165 shifts the sleeve 162 to the position shown in Fig. 15. This blocks off the pressure lines 303. It directly connects the rear pump through lines 311 through ports 180 and 180a of the shifted sleeve to line 304 which extends to the clutch valve 200. Line 313 is vented through exhaust port 182 of the over-control valve. This lets the master valve come back from the Fig. 14 position to the Fig. 13 position. This movement of the master valve vents the line 324 through the master valve vent port 156 so that the clutch relay actuator shifts back from the Fig. 14 position to the Fig. 13 position. This opens the connection from line 305 to line 307 through the clutch valve 200 to apply oil under pressure to the rear clutch B for its engagement and it cuts off connection between the pressure lines 306 and 308 to the front clutch. The movement of the sleeve 162 directly connects the rear pump through line 314 and port 183 of the over-control valve to the line 315 for applying pressure into port 221 of the power coupler relay valve to maintain the high ratio position of the coupler. The front clutch will now disengage and the rear clutch will become engaged in the manner as above described and upon full engagement of the rear clutch, the third speed ratio is attained. This ratio will be maintained until the throttle is allowed to be retracted through the lash movement $x$ at which time the head 164 picks up the sleeve 162 and shifts it back from the Fig. 15 position to the Fig. 13 position.

The relative timing of the action of the clutches is controlled to accommodate for different torque conditions. This is the purpose of the control valve member 211 of the clutch valve, the position of which changes with the position of the throttle. This member has ports 214 for lining up with the ports 201 and 210 in the body and valve rod. Shift of the member 211, therefore, in accordance with throttle position, varies the nature of the passage through the clutch valve. The position shown in Fig. 14, corresponds to that of a light throttle. Under heavy throttle with the accelerator depressed the ports 214 shift to the right. Therefore, the effective distance between the port 203 for the front clutch and port 204 for the rear clutch is changed. In other words, with the valve member 211 positioned to the right as Fig. 14 is viewed, the port 210, in the movement of the rod 208 to the left, opens the connection to the front clutch sooner than it would if the member 211 were positioned as shown with a light throttle.

The diagram in Fig. 17 indicates the function on the up shift, that is, a shift from a low ratio to a higher ratio. In this chart the ordinates are in the terms of torque plotted against abscissa in terms of angular displacement or radians per second and, therefore, the chart is an energy or work graph. The disengagement curve of the rear clutch B is indicated at $f$, the disengaging action starting substantially at the line $g$. Under a heavy throttle with the control valve member 211 shifted outwardly of the valve body 200, that is, to the right as Fig. 14 is viewed, the port 214 is shifted to the right and is therefore opened by the valve member 208 in an earlier stage of its movement to the left. With a full-open throttle the engagement curve of the front clutch A is shown at $h$. The two curves intersect at some intermediate point as at $i$ at which time all torque is absorbed by the clutches with none transmitted through the gearing. As above described, the disengaging clutch B provides reaction to engaging clutch A with bodily movement of all the clutch plates and there is an energy loss area represented at $k$ following which the engaging front clutch curve continues as at $h'$ with the disengaging rear clutch extending along the line $f$ as shown. Due to other factors the area $k$ is probably not entirely accurate on the graph but it represents a principle of operation and among other things the engagement curve of the engaging clutch A will probably not be a constant between $h$ and $h'$ as shown. The graph in Fig. 17 is made primarily to show the progressive nature of the beginning of the engagement of one clutch relative to the beginning of the disengagement of the other. The disengagement curve $f$ is therefore not strictly correct but is examplary only in the region thereof below the area $k$. Under a lighter throttle, the disengagement of the rear clutch may begin at the line $g$ and generally follow the engagement curve $f$, but because the control valve member 211 is telescoped into the valve body 200 somewhat, the engaging action of the front clutch A does not start so early. Under a medium throttle the engagement of the front clutch may be indicated by line $l$ and $l'$. The frictional loss area is reduced, as shown at $k'$, and the point of intersection of the curves is lowered as at $i$. The engagement curve $m$ and $m'$ indicates an up-shift at a low throttle and the intersection of the curves at $i^2$ being at a still lower torque valve and the area $k^2$ lowered in position and ensmalled. A shift at a very light throttle is shown by the engagement curve $n$ and $n'$ with a corresponding change in position at the point of intersection of the curves as shown at $i^3$ and a variation in the frictional energy loss area $k^3$. This is more fully described and claimed in my co-pending application Serial No. 655,838 filed March 20, 1946.

The transmission provides an arrangement wherein the engine may be started by pushing or towing the vehicle. In this event the rear pump 15a is started in operation by movement of the vehicle and oil under pressure is furnished thereby to operate the transmission for connecting the engine to the shaft 71. The oil is pumped through the line 312, through the over-control valve into the line 313, which extends to the inlet 151 of the master valve. The master valve is now under the dual control of pressure and throttle position. As the pressure increases, due to increased speed of the vehicle, the master valve member 155 is shifted to the right as Fig. 13 is viewed. It will uncover the second speed port 152 but nothing happens because the front pump is not operating and there is no pressure. It will be understood, therefore, that both clutches are disengaged. The coupler is coupled to gear 82 by the action of the spring 129. As the speed of the vehicle further increases, the master valve member 155 will continue its shift and open the third speed port 153. Oil under pressure will now be transmitted through the over-control valve to line 315 and into the power coupler relay valve 220 through port 221. This will shift the valve member 224 to the position shown in Fig. 14 and oil under pressure is then transmitted through the high pressure line 310 through the power coupler relay valve into the power coupler servo line 326.

As there is no torque load other than frictional load on the dentally engaging teeth 94 and 95, the coupler will immediately shift out of dental engagement with the gear 82 as oil is introduced into the servo cylinder 120 to overcome the spring pressure of 129 and the coupler will shift to the left as Fig. 2 is viewed until it couples with the gear 54. The clutches are still disengaged. As the coupler thus moves the sleeve 125 will engage and shift the valve member 251 thus connecting the rear pump pressure line 310 through this valve (Fig. 14) to line 302. From this line the oil under pressure is transmitted through the over-control valve into line 304. The last increment of movement of the piston rod 124 shifts the valve member 230 of the high-low control valve to the left and thus closes the connection between the pressure line 320 and the pressure line 321, as shown in Fig. 14. It will be understood that the lines 320 and 321 were initially connected with the valve member 230 positioned as shown in Fig. 13. The spring 192 shifts the clutch relay actuator piston 191 to the full-line position as shown in Fig. 13 so that oil under pressure is transmitted from line 305 to line 307 which extends to the rear clutch for engaging the same. As the rear clutch becomes engaged the engine is coupled to the shaft 31 in the third speed ratio, namely, through the rear clutch B, sleeve 55, gear 56, gear 84, gear 85 to gear 54.

Now, in this function the angularity of the blocking faces plays a part. We refer to the blocking faces 107 and 108 and cooperating blocking faces on the pins. This arrangement of inclined blocking faces for automatic engagement is fully described and claimed in my co-pending application Serial No. 565,639 filed November 29, 1944, now Patent No. 2,518,735, dated August 15, 1950. Suffice it to say here that the angularity of the faces is such that they serve as blocking agencies when the members are under torque load. But if a member becomes free the blocking faces act with a camming action for movement of the coupler. For instance, with both clutches disengaged the spring 129 will push the coupler to the right as Fig. 2 is viewed, and the camming action is sufficient to oscillate the gear 82 and the clutch driven plates so that any blocking action is destroyed and the coupler moves into dental engagement with the gear 82. This insures that at the position of rest, there will always be a dental engagement of the teeth 94 and 95. In making a start where the vehicle is pushed or towed, as just described, the coupler will move out of engagement immediately when oil pressure acting upon servo piston 123 through spring 126 is sufficient to overcome the pressure of sleeve spring 129. The inclined teeth, indeed, aid in this movement because the direction of deliverance of torque is reversed. If the face 107 strikes the abutment shoulder 112, it will cam the blocker out of the way thus oscillating the gear 54; if the face 107 strikes face 109 it will cam the blocker and gear 54 in the opposite direction. Accordingly, there is no blocking action in the push or tow start as just described because of the disengagement of both clutches and the angular camming function of the blocking faces.

I claim:

1. In an apparatus for transmitting torque from a driving member to a driven member, the combination of two friction clutches arranged to be engaged and disengaged, a gear set including first and second gears connected respectively to the two clutches to be driven thereby, other gears interconnecting said first and second gears for operation at different speeds of rotation, a coupler having dental engaging teeth, the gear set including two gears each having dental engaging teeth, the coupler being shiftable to a position of dental engagement with one of said two gears and to a position of dental engagement with the other of said two gears, said two gears being connected to the clutches to operate at different speeds of rotation, the clutches being associated with one member and the coupler being associated with the other member, control means operable to engage one clutch and disengage the other when the coupler is in either one of its said two positions, control means for shifting the coupler from dental engaged position with one of said two gears to dentally engaged position of the other of said two gears, and means for causing engaging of both of said friction clutches to set up a bucking action effected by said first and second gears to vary the speed of rotation of the gear about to be engaged relative to the speed of rotation of the coupler so that the coupler may be shifted into engagement with said last named gear when the last named gear has a speed of rotation substantially the same as that of the coupler.

2. In an apparatus for transmitting torque from a driving member to a driven member, the combination of two friction clutches arranged to be engaged and disengaged, a gear set including first and second gears connected respectively to the two clutches to be driven thereby, other gears interconnecting said first and second gears for operation at different speeds of rotation, a coupler having dental engaging teeth, the gear set including two gears each having dental engaging teeth, the coupler being shiftable to a position of dental engagement with one of said two gears and to a position of dental engagement with the other of said two gears, said two gears being connected to the clutches to operate at different speeds of rotation, the clutches being associated with one member and the coupler being associated with the other member, control means operable to engage one clutch and disengage the other when the coupler is in either one of its said two positions, control means for shifting the coupler from dental engaged position with one of said two gears to dentally engaged position of the other of said two gears, means for causing engaging of both of said friction clutches to set up a bucking action effected by said first and second gears to vary the speed of rotation of the gear about to be engaged relative to the speed of rotation of the coupler, so that a dental engagement may be made when the said last named gear is operating substantially at the same speed as the coupler, and means operable by movement of the coupler toward dental engagement with the gear about to be engaged to cause disengagement of one of the clutches.

3. A transmission for the transmission of torque from a driving member, which is connected to an internal combustion engine, to a driven member, the combination of two friction clutches arranged to be engaged and disengaged and having driving elements connected to the driving member, the friction clutches having driven elements, a gear set having first and second gears respectively connected to the driven elements of each of said clutches, other gears interconnecting the first and second gears for operation at different speeds of rotation, a coupler connected to the driven member, said coupler having dental engaging teeth, two gears of the gear set having dental engaging teeth, said coupler being shiftable to a position of dental engagement with one of said two gears and to a position of dental engagement with the other of said two gears, clutch control means operable for engaging one clutch and disengaging the other for establishing different speed ratios between the driving and driven members, coupler control means operable for shifting the coupler from one position of dental engagement to the other position of dental engagement for establishing different speed ratios between the driving and driven members, the coupler control means being effective on the clutch control means for causing engaging action of both clutches prior to dental disengagement of the coupler with one gear to substantially relieve the coupler of torque load, the engaged clutches and the said first and second gears serving, after such disengagement of the coupler, to vary the speed of the engine and the gear about to be dentally engaged relative to the speed of rotation of the coupler, and the coupler control means being effective to cause release of the engaging action of one clutch substantially when the speed of the gear about to be coupled is operating substantially at the same speed as the coupler.

4. A transmission for the transmission of torque from a driving member, which is connected to an internal combustion engine, to a driven member, the combination of two friction clutches arranged to be engaged and disengaged and having driving elements connected to the driving member, the friction clutches having driven elements, a gear set having first and second gears respectively connected to the driven elements of each of said clutches, other gears interconnecting the first and second gears for operation at different speeds of rotation, a coupler connected to the driven member, said coupler having dental engaging teeth, two gears of the gear set having dental engaging teeth, said coupler being shiftable to a position of dental engagement with one of said two gears and to a position of dental engagement with the other of said two gears, clutch control means operable for engaging one clutch and disengaging the other for establishing different speed ratios between the driving and driven members, coupler control means operable for shifting the coupler from one position of dental engagement to the other position of dental engagement for establishing different speed ratios between the driving and driven members, the control means for shifting the coupler including an element shiftable in advance of the coupler movement, said element being active upon the control means for the clutches for establishing engaging action of both clutches, to set up a bucking action effected by said first and second gears, whereby, when the coupler has moved out of dental engagement with one gear, to vary the speed of rotation of the gear about to be engaged by the coupler relative to the speed of the coupler for movement of the coupler into a dental engaged position with the said last named gear when the speed of rotation thereof is substantially the same as that of the coupler, the control means for shifting the coupler including a second element active upon the control means for the clutches to cause release of the engaging action of one clutch when the last named gear and the coupler are rotating at substantially the same speed.

5. A transmission for the transmission of torque from a driving member, which is connected to an internal combustion engine, to a driven member, the combination of two friction clutches arranged to be engaged and disengaged and having driving elements connected to the driving member, the friction clutches having driven elements, a gear set having first and second gears respectively connected to the driven elements of each of said clutches, other gears interconnecting the first and second gears for operation at different speeds of rotation, a coupler connected to the driven member, said coupler having dental engaging teeth, two gears of the gear set having dental engaging teeth, said coupler being shiftable to a position of dental engagement with one of said two gears and to a position of dental engagement with the other of said two gears, clutch control means for causing selective engagement and disengagement of the clutches, coupler control means for shifting the coupler from one dental engaged position to the other, said coupler having neutral non-engaged position, the coupler control means including an element shiftable to condition the coupler control means for action, said element being active upon the clutch control means for establishing engagement of both clutches to take the torque of the engine through said first and second gears and relieve the load thereof from the dentally engaging teeth for movement of the coupler out of dentally engaged position to a neutral position, means for blocking the coupler in neutral position while the gear about to be dentally engaged is dis-synchronized relative to the coupler, the continued engagement of the two clutches serving, through the means of said first and second gears, to vary the speed of the gear about to be dentally engaged relative to the speed of the coupler, the blocking means becoming ineffective substantially when the said gear and coupler are operating at the same speed for further movement of the coupler toward dental engagement with the last named gear, the control means for shifting the coupler including an element active upon the clutch control means in such further movement of the coupler to cause relief of the engaging action of one of the clutches.

6. A transmission for the transmission of torque from a driving member, which is connected to an internal combustion engine, to a driven member, the combination of two friction clutches arranged to be engaged and disengaged and having driving elements connected to the driving member, the friction clutches having driven elements, a gear set having first and second gears respectively connected to the driven elements of each of said clutches, other gears interconnecting the first and second gears for operation at different speeds of rotation, a coupler connected to the driven member, said coupler having dental engaging teeth, two gears of the gear set having dental engaging teeth, said coupler being shiftable to a position of dental engagement with one of said two gears and to a position of dental engagement with the other of said two gears, clutch control means for engaging one clutch and releasing the other, coupler control means for shifting the same from one dental engaged position to the other, the coupler having a neutral dis-engaged position, the control means including an element movable to cause engaging action of both clutches to relieve, through said first and second gears, the torque from the coupler for its movement out of dental engagement with one gear, and for varying the speed of the other gear relative to the coupler while the coupler is in a neutral position, the coupler control means including an element shiftable as the coupler moves from the said neutral position toward dental engagement with the other gear for causing disengagement of one of the clutches.

7. A transmission for the transmission of torque from a driving member, which is connected to an internal combustion engine, to a driven member, the combination of two friction clutches arranged to be engaged and disengaged and having driving elements connected to the driving member, the friction clutches having driven elements, a gear set having first and second gears respectively connected to the driven elements of each of said clutches, other gears interconnecting the first and second gears for operation at different speeds of rotation, a coupler connected to the driven member, said coupler having dental engaging teeth, two gears of the gear set having dental engaging teeth, said coupler being shiftable to a position of dental engagement with one of said two gears and to a position of dental engagement with the other of said two gears, clutch control means for engaging one clutch and releasing the other, coupler control means for shifting the coupler from one position of dental engagement to the other position of dental engagement, said coupler having a neutral position, the coupler control means including an element for initial movement for causing engagement of both clutches to relieve, through the means of the said first and second gears, the coupler of torque for its movement out of one dental engaged position to neutral position, the continued engagement of both clutches serving, through said first and second gears, to vary the speed of operation of the gear about to be engaged relative to the coupler, the coupler control means including an element for shift with the coupler as it moves from said neutral position toward dental engagement with the last named gear and operative to relieve engaging action of one of the clutches.

8. A transmission for the transmission of torque from a driving member, which is connected to an internal combustion engine, to a driven member, the combination of two friction clutches, a gear set including first and second gears driven respectively by the two clutches and geared for operation at different speeds of rotation, a coupler shiftable from a position of dental engagement with one of the gears to a position of dental engagement with another gear of the gear set, said coupler having a neutral disengaged range of positions, clutch control means for selectively engaging one clutch and disengaging the other, coupler control means for shifting the coupler from one position of dental engagement to the other position of dental engagement, the coupler control means including an element initially shiftable to cause engaging action of both clutches to deliver torque to both the first and second gears to thereby relieve the coupler of torque, whereby the same shifts out of one dental engaged position to a neutral position, blocking means for holding the coupler in neutral position, the continued engagement of both clutches, with torque delivered to both first and second gears serving to vary the speed of operation of the gear about to be dentally engaged relative to the coupler, the blocking means releasing the coupler for movement in its range of neutral positions substantially when the speed of the gear about to be engaged by the coupler is the same as that of the coupler, the coupler control means including an element shiftable as the coupler moves in said range of neutral positions and operative for releasing the engaging action of one of the clutches.

9. A transmission for the transmission of torque from a driving member, which is connected to an internal combustion engine, to a driven member, the combination of two friction clutches, a gear set including first and second gears driven respectively by the two clutches and geared for operation at different speeds of rotation, a coupler shiftable from a position of dental engagement with one of the gears to a position of dental engagement with another gear of the gear set, said coupler having a neutral disengaged range of positions, clutch control means for selectively engaging one clutch and disengaging the other, coupler control means for shifting the coupler from one position of dental engagement to the other position of dental engagement, the coupler control means including elements for causing engaging action of both clutches with delivery of torque to both said first and second gears for movement of the coupler out of one dentally engaged position, and for maintaining engaging action of both clutches while the coupler is in a neutral position and operable to relieve the engaging action of one clutch as the coupler moves from said neutral position toward the other dental engaged position, whereby the coupler is relieved of torque for movement out of one dentally engaged position and the speed of operation of the gear which the coupler is about to dentally engage is varied until it is substantially the same as the speed of operation of the coupler.

10. A transmission for the transmission of torque from a driving member which is connected to an internal combustion engine, to a driven member, the combination of two friction clutches, having driving elements connected to the driving member, the friction clutches having driven elements, a gear set having first and second gears respectively connected to the driven elements of the clutches and geared together to operate at different speeds of rotation, a coupler connected to the driven member, said coupler having dental engaging teeth, two of the gears of the gear set having dental engaging teeth, the coupler being shiftable to a position of dental engagement with one of the gears and to a position of dental engagement with the other of two gears, blocking means operable by relative torque reaction for blocking the coupler in a first neutral position, blocking means operable by opposite relative motion reaction for blocking the coupler in a second neutral position, clutch control means for selectively engaging one clutch and disengaging the other, coupler control means for shifting the coupler, said coupler control means including an element shiftable prior to coupler movement and which is operable to cause engaging action of both clutches to thereby deliver torque to both first and second gears and thereby relieve the coupler of torque for its movement out of dental engagement with one gear to the first blocked position, the engaging clutches and first and second gears serving to decelerate the engine and the other gear toward which the coupler is about to move until the other gear is operating slower than the coupler to reverse the relative motion reaction for movement of the coupler to the second blocking position, means operative in this movement of the coupler for starting the disengagement of one of the clutches for acceleration of the engine and the other gear about to be dentally engaged so that when the said other gear begins to run faster than the coupler the relative motion reaction is destroyed and the coupler moves into dental engagement with the said other gear substantially when said other gear and coupler are operating at the same speed.

11. In a transmission for transmitting torque from a driving member which is connected to an internal combustion engine, to a driven member, the combination of two friction clutches associated with the driving member, a gear set arranged to be driven by the clutches including first and second gears connected respectively to the two clutches and geared for operation at different speeds of rotation, a coupler connected to the driven member, said coupler being shiftable from dental engagement with one gear of the set to dental engagement with another gear of the set, clutch control means for selectively engaging one clutch and releasing the other, coupler control means including an element shiftable prior to coupler movement for causing engagement of both clutches to deliver torque to both said first and second gears and thereby relieve the dentally engaging teeth of the coupler and the one gear of torque for movement of the coupler out of dental engagement, the coupler control means including an element operable by movement of the coupler while disengaged from both gears for initiating release of the engaging action of one clutch.

12. In a transmission for an automotive vehicle having a driving member connected to an internal combustion engine, and a driven member, two friction clutches, a set of gears including first and second gears respectively connected to the two clutches and geared for operation at different speeds of rotation, a coupler shiftable to and from positions of selective engagement with two of the gears, the coupler having a neutral non-engaged position, the clutches and the set of gears being between the driving and driven members for establishing various speed ratios by selective engagement of the clutches and positioning of the coupler, control means for selectively engaging the clutches and for selectively positioning the coupler including operating means for the coupler which is effective upon the clutch control means for causing simultaneous engaging action of both clutches to deliver torque to both first and second gears and thereby relieve the coupler of the engine torque prior to coupler movement out of dental engagement with one gear and for initiating release of the engaging action of one of the clutches to condition the gearing for dental engagement of the coupler with the other of the said two gears.

13. In a transmission for an automotive vehicle having a driving member connected to an internal combustion engine, and a driven member, two friction clutches, a set of gears including first and second gears respectively connected to the two clutches and geared for operation at different speeds of rotation, a coupler shiftable to and from positions of selective engagement with two of the gears, the coupler having a neutral non-engaged position, the clutches and the set of gears being between the driving and driven members for establishing various speed ratios by selective engagement of the clutches and positioning of the coupler, control means for selectively engaging the clutches and selectively positioning the coupler including operating means shiftable prior to coupler movement to cause engaging action of both clutches to deliver torque to both first and second gears and thereby to relieve the coupler of engine torque for its shift out of dental engagement with one gear, said operating means maintaining engaging action of both clutches while the coupler is in its neutral position for conditioning the gears for shift of the coupler into dental engagement with the other of the two gears, and means movable with the coupler in its neutral position for acting upon the clutch control means for discontinuing the engaging action of one clutch for further conditioning of the gears for movement of the coupler into dental engagement with the said other gear.

14. In a transmission for an automotive vehicle having a driving member connected to an internal combustion engine, and a driven member, two friction clutches, a set of gears including first and second gears respectively connected to the two clutches and geared for operation at different speeds of rotation, a coupler shiftable to and from positions of selective engagement with two of the gears, one of which operates at a speed slower than the other, the coupler having neutral non-engaged positions, the clutches and the set of gears being between the driving and driven members for establishing various speed ratios by selective engagement of the clutches and positioning of the coupler, clutch control means for selective engagement of the clutches, coupler control means for selective positioning of the coupler, the coupler control means including an actuator shiftable prior to coupler movement and active upon the clutch control means to cause engaging action of both clutches to deliver torque to both first and second gears and thereby relieve the coupler of torque for its movement out of dental engagement with the slower running gear, means blocking the coupler in a first neutral position while the engaging action of both clutches continues for decelerating the speed of the other gear, means operative when the said other gear decelerates to a speed lower than the speed of the coupler for blocking the coupler in a second blocked position, an actuator movable as the coupler shifts from the first blocking position to the second blocking position and active upon the clutch control means for causing disengaging action of one clutch for the acceleration of the speed of rotation of the said other gear, the second blocking means being released when the said other gear accelerates to substantially the speed of rotation of the coupler for movement of the coupler into dental engagement with the said other gear.

15. In a transmission for transmitting torque from a driving member which is connected to an internal combustion engine to a driven member, the engine having a throttle, a throttle actuator, two friction clutches, each having driving elements connected to the driving member, and driven elements connectable to the driven member at different speed ratios, means operable for causing engagement of one clutch and disengagement of the other clutch for changing the speed ratio between the driving and driven members, said clutches being arranged so that the engaging clutch obtains reaction to its engaging pressure from the disengaging clutch throughout a portion of the engaging and disengaging action, and control means operable by the throttle actuator to vary the beginning of the disengagement of one clutch relative to the beginning of the engagement of the other clutch in accordance with the position of the throttle actuator.

16. In a transmission for transmitting torque from a driving member which is connected to an internal combustion engine to a driven member, the engine having a throttle, a throttle actuator, two friction clutches, each having driving elements connected to the driving member, and driven elements connectable to the driven member at different speed ratios, means operable for causing engagement of one clutch and disengagement of the other clutch for changing the speed ratio between the driving and driven members, said clutches being arranged so that the engaging clutch obtains reaction to its engaging pressure from the disengaging clutch throughout a portion of the engaging and disengaging action, and control means operable in accordance with the position of the throttle actuator for varying the beginning of the engagement of one clutch relative to the beginning of disengagement of the other clutch.

17. In a transmission for transmitting torque from a driving member which is connected to an internal combustion engine to a driven member, the engine having a throttle, a throttle actuator, two friction clutches, each having driving elements connected to the driving member, and driven elements connectable to the driven member at different speed ratios, means operable for causing engagement of one clutch and disengagement of the other clutch for changing the speed ratio between the driving and driven members, said clutches being arranged so that the engaging clutch obtains reaction to its engaging pressure from the disengaging clutch throughout a portion of the engaging and disengaging action, and control means operable in accordance with the position of the throttle actuator for delaying the beginning of engagement of one clutch in a substantially progressive manner with progressive decrease of throttle opening relative to the beginning of disengagement with the other clutch.

18. In a transmission for transmitting torque from a driving member which is connected to an internal combustion engine to a driven member, the engine having a throttle whereby its torque output is variable, two friction clutches, each having driving elements connected to the driving member, and driven elements connectable to the driven member at different speed ratios, means operable for causing engagement of one clutch and disengagement of the other clutch for changing the speed ratio between the driving and driven members, said clutches being arranged so that the engaging clutch obtains reaction to its engaging pressure from the disengaging clutch throughout a portion of the engaging and disengaging action, and control means sensitive to the torque output of the engine as determined by the position of the throttle for varying the time of the beginning of engagement of one clutch relative to the time of the beginning of the disengagement of the other clutch.

19. In a transmission for transmitting torque from a driving member which is connected to an internal combustion engine to a driven member, the engine having a throttle whereby its torque output is variable, two friction clutches, each having driving elements connected to the driving member, and driven elements connectable to the driven member at different speed ratios, means operable for causing engagement of one clutch and disengagement of the other clutch for changing the speed ratio between the driving and driven members, said clutches being arranged so that the engaging clutch obtains reaction to its engaging pressure from the disengaging clutch throughout a portion of the engaging and disengaging action, and control means sensitive to the torque output of the engine as determined by the position of the throttle for delaying the time of the beginning of the engagement of one clutch relative to the time of the beginning of the disengagement of the other clutch substantially in accordance with progressive decrease in the torque output of the engine.

20. In a transmission for an automotive vehicle having a driving member connected to an internal combustion engine, and a driven member, the engine having throttle means, a throttle actuator, two friction clutches, a set of gears, a coupler shiftable to and from positions of selective dental engagement with the two gears, the clutches and the set of gears being positioned between the driving and driven members for establishing various speed ratios by selective engagement of the clutches and positioning of the coupler; hydraulic control means comprising a pump operable with the driven member for supplying hydraulic medium under pressure, pressure lines leading from the pump to the clutches and to the coupler for actuating the same, valve means in the pressure lines including a master valve under the combined influence of pressure of the medium and position of the throttle actuator, the master valve being arranged and constructed to open and close pressure lines for selective engagement of the clutches and positioning of the coupler for establishing different speed ratios between the driving and driven members, and an over-control valve connected to the throttle actuator and operative substantially upon full throttle opening movement of the throttle actuator to close the pressure line to the master valve and to open a pressure line which by-passes the master valve for maintaining the position of the coupler and for shift of the master valve for causing disengagement of the previously selected clutch and engagement of the other clutch to establish a speed ratio between the driving and driven members which is lower than the one otherwise normally selected by the master valve.

21. In a transmission for an automotive vehicle having a driving member connected to an internal combustion engine, and a driven member, the engine having throttle means, a throttle actuator, two friction clutches, a set of gears, a coupler shiftable to and from positions of selective dental engagement with the two gears, the clutches and the set of gears being positioned between the driving and driven members for establishing various speed ratios by selective engagement of the clutches and positioning of the coupler, hydraulic control means comprising a pump operable with the driven member for supplying hydraulic medium under pressure, pressure lines leading from the pump to the clutches and to the coupler for actuating the same, valve means in the pressure lines including a master valve under the combined influence of pressure of the medium and position of the throttle actuator, the master valve being arranged and constructed to open and close pressure lines for selective engagement of the clutches and positioning of the coupler for establishing different speed ratios between the driving and driven members, and an over-control valve connected to the throttle means and operative substantially upon full throttle opening movement of the throttle actuator to close the pressure line to the master valve and open a pressure line which by-passes the master valve for maintaining the position of the coupler and for shift of the master valve for causing disengagement of the previously selected clutch and engagement of the other clutch to establish a speed ratio between the driving and driven members which is lower than the one otherwise normally selected by the master valve, said over-control valve being arranged and constructed to maintain said operative position to thereby maintain said speed ratio established by the over-control valve throughout the full range of movement of the throttle actuator until the throttle actuator moves substantially to full throttle closed position.

22. In a transmission for an automotive vehicle for transmitting torque from a driving member which is connected to an internal combustion engine, to a driven member, said engine having a throttle, a throttle actuator, the combination of two friction clutches between the driving and driven members for providing different speed ratios, hydraulic control means including a pump associated with the driven member, pressure lines for liquid under pressure, a clutch selector valve, a master valve under the combined influence of throttle actuator position and pressure, an over-control valve connected to the throttle actuator, the over-conrol valve being in the pressure line in advance of the master valve, the master valve serving to actuate the clutch selector valve for the engagement of one clutch under appropriate throttle actuator position to provide a high ratio, the over-control valve being actuated upon an excess of full movement of the throttle actuator to close the pressure line to the master valve for movement of the clutch selector valve for the disengagement of its normally selected clutch and engagement of the other clutch whereby to effect a lower over-control ratio between the driving and driven members.

23. In a transmission for an automotive vehicle for transmitting torque from a driving member, which is connected to an internal combustion engine, to a driven member, said engine having a throttle, a throttle actuator, the combination of two friction clutches between the driving and driven members for providing different speed ratios, hydraulic control means including a pump, pressure lines for liquid under pressure, a clutch selector valve, a master valve under the combined influence of throttle actuator position and pressure, an over-control valve connected to the throttle actuator, the over-control valve being in the pressure line in advance of the master valve, the master valve serving to actuate the clutch selector valve for the engagement of one clutch under appropriate throttle position actuator, the over-control valve being actuated upon an excess of full movement of the throttle actuator to close the pressure line to the master valve for movement of the clutch selector valve for the disengagement of its normally selected clutch and engagement of the other clutch, whereby to effect a lower over-control ratio between the driving and driven members, said over-control valve being so connected with the throttle actuator by a loss play action that the same is re-actuated substantially only upon full release of the throttle.

24. In a transmission for an automotive vehicle having a driving member connected to an internal combustion engine, and a driven member, the engine having throttle means, a throttle actuator, two friction clutches, a set of gears, a coupler shiftable to and from positions of selective dental engagement with the two gears, the clutches and the set of gears being positioned between the driving and driven members for establishing various speed ratios by selective engagement of the clutches and positioning of the coupler, hydraulic control means comprising a pump associated with the driven member for supplying hydraulic medium under pressure, pressure lines leading from the pump to each clutch and to the coupler for actuating the same, control valves in the pressure lines including, clutch selector valve means, coupler position valve means, a master valve, said master valve being connected to the throttle actuator and being under the combined influence of pressure of the medium and position of the throttle actuator, said master valve being arranged and constructed to selectively cause operation of the clutch selector valve means and the coupler positioning valve means for selective engagement of the clutches and positioning of the coupler for establishing different speed ratios between the driving and driven members.

25. A transmission for the transmission of torque from a driving member to a driven member, the combination of two friction clutches, a gear set, a coupler, said coupler being shiftable from a position of dental engagement with one gear to a position of dental engagement with the other gear, the clutches and the gear set being disposed between the driving and driven members, hydraulic control means including a first pump operable with the driving member and a second pump operable with the driven member, a pressure line leading from each of the pumps for providing hydraulic medium for the operation of the clutches, controlling valve means for causing selective engagement of the clutches and for effecting selective positioning of the coupler to provide different speed ratios between the driving and driven members, said controlling valve means including a range valve for opening the said pressure line from the first pump and closing the said pressure line from the second pump when the coupler is in one position of dental engagement and an element shiftable as the coupler moves from said one position of dental engagement toward its other position of dental engagement, and which is active upon said range valve for closing the said pressure line from the first pump and for opening said pressure line from the second pump.

ERNEST E. WEMP.

REFERENCES CITED

The following references are of record in the file of this patent:

UNITED STATES PATENTS

| Number | Name | Date |
|---|---|---|
| 2,099,141 | Railton et al. | Nov. 16, 1937 |
| 2,184,941 | Maroto | Dec. 26, 1939 |
| 2,201,169 | Griswold | May 21, 1940 |
| 2,256,320 | Lapsley | Sept. 16, 1941 |
| 2,319,388 | Cotterman | May 18, 1943 |
| 2,352,212 | Lang et al. | June 27, 1944 |
| 2,376,545 | Livermore | May 22, 1945 |